(12) United States Patent
Lam et al.

(10) Patent No.: US 10,423,393 B2
(45) Date of Patent: Sep. 24, 2019

(54) INTELLIGENT FLOW DESIGNER

(71) Applicant: Microsoft Technology Licensing, LLC, Redmond, WA (US)

(72) Inventors: Kevin Lam, Woodinville, WA (US); Balasubramanian Shyamsundar, Redmond, WA (US); Joon Y. Chung, Redmond, WA (US); Stephen Siciliano, Bellevue, WA (US); Charles Lamanna, Bellevue, WA (US); Ilya V. Grebnov, Kirkland, WA (US); Priti Sambandam, Bellevue, WA (US); Himanshu Agrawal, Bellevue, WA (US); Prabir K. Shrestha, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 15/274,935

(22) Filed: Sep. 23, 2016

(65) Prior Publication Data

US 2017/0315789 A1 Nov. 2, 2017

Related U.S. Application Data

(60) Provisional application No. 62/329,083, filed on Apr. 28, 2016.

(51) Int. Cl.
*G06F 9/44* (2018.01)
*G06F 8/38* (2018.01)
(Continued)

(52) U.S. Cl.
CPC ............. *G06F 8/38* (2013.01); *G06F 3/0482* (2013.01); *G06F 3/04847* (2013.01); *G06F 8/20* (2013.01);
(Continued)

(58) Field of Classification Search
None
See application file for complete search history.

(56) References Cited

U.S. PATENT DOCUMENTS 7,152,229 B2  12/2006  Chong et al.
7,464,366 B2  12/2008  Shukla et al.
(Continued)

FOREIGN PATENT DOCUMENTS

CN    101452389 A      6/2009
WO    2006110981 A1   10/2006
(Continued)

OTHER PUBLICATIONS

"International Search Report and Written Opinion Issued in PCT Application No. PCT/US2017/029504", dated Jul. 6, 2017, 11 Pages.
(Continued)

*Primary Examiner* — Insun Kang
(74) *Attorney, Agent, or Firm* — Fiala & Weaver P.L.L.C.

(57) ABSTRACT

Methods, systems, apparatuses, and computer program products are provided for developing workflows. An input control may be rendered in association with the rendered representation of a workflow step corresponding to an input parameter. A developer is enabled to interact with the input control to select a parameter value for the input parameter. A workflow is enabled to be developed that includes a push notification workflow step configured to issue a push notification when encountered in the work flow and to wait for a response before enabling the workflow to continue. A workflow saved in a user folder is enabled to be selected for insertion into further workflows. A subscription workflow step may be selected for inclusion in a second workflow that
(Continued)

US 10,423,393 B2

Page 2 is configured to wait for output information from a subscribed-to workflow before enabling the second workflow to continue.

20 Claims, 15 Drawing Sheets

(51) Int. Cl.
*G06F 3/0482* (2013.01)
*G06F 3/0484* (2013.01)
*G06F 8/20* (2018.01)
*G06F 8/34* (2018.01)
*G06Q 10/06* (2012.01)

(52) U.S. Cl.
CPC ............. *G06F 8/34* (2013.01); *G06Q 10/067* (2013.01); *G06Q 10/0633* (2013.01)

(56) References Cited

U.S. PATENT DOCUMENTS

| | | | |
|---|---|---|---|
| 8,589,874 B2 | 11/2013 | Ralls et al. | |
| 8,719,773 B2 | 5/2014 | Slone et al. | |
| 8,849,691 B2 | 9/2014 | Sanabria et al. | |
| 9,710,307 B1* | 7/2017 | Corley | G06F 9/4843 |
| 9,720,732 B1* | 8/2017 | Shih | G06F 9/4887 |
| 2006/0149560 A1 | 7/2006 | Podhajsky et al. | |
| 2007/0266368 A1* | 11/2007 | Szpak | G06F 8/10 |
| | | | 717/105 |
| 2009/0293059 A1 | 11/2009 | Nathan et al. | |
| 2012/0254825 A1* | 10/2012 | Sharma | G06F 8/34 |
| | | | 717/101 |
| 2013/0073994 A1* | 3/2013 | Liao | G06F 3/048 |
| | | | 715/762 |
| 2013/0152038 A1* | 6/2013 | Lim | G06Q 10/103 |
| | | | 717/101 |
| 2013/0158964 A1 | 6/2013 | Hall et al. | |
| 2014/0047028 A1* | 2/2014 | Buth | G06F 9/546 |
| | | | 709/204 |
| 2014/0282367 A1* | 9/2014 | Harrill | G06F 8/31 |
| | | | 717/105 |
| 2014/0372974 A1 | 12/2014 | Welicki et al. | |
| 2015/0170088 A1* | 6/2015 | Rizk | G06F 8/34 |
| | | | 705/7.26 |
| 2016/0055126 A1* | 2/2016 | Doerr | H04L 67/10 |
| | | | 715/745 |
| 2016/0259534 A1* | 9/2016 | Simons | G06F 3/0482 |
| 2016/0358102 A1* | 12/2016 | Bowers | G06N 99/005 |
| 2017/0147296 A1* | 5/2017 | Kumar | G06F 8/22 |

FOREIGN PATENT DOCUMENTS

| | | |
|---|---|---|
| WO | 2013033824 A2 | 3/2013 |
| WO | 2015047076 A2 | 4/2015 |
| WO | 2015095322 A1 | 6/2015 |

OTHER PUBLICATIONS

Liao, et al., "A Study of Automatic Code Generation", in Proceedings of International Conference on Computational and Information Sciences, Dec. 17, 2010, pp. 689-691.

Klein, John, "Model Driven Engineering: Automatic Code Generation and Beyond", Published on: May 11, 2015 Available at: https://insights.sei.cmu.edu/sei_blog/2015/05/model-driven-engineering-automatic-code-generation-and-beyond.html.

* cited by examiner

INTELLIGENT FLOW DESIGNER

CROSS REFERENCE TO RELATED APPLICATIONS

This application claims the benefit of U.S. Provisional Application No. 62/329,083, filed on Apr. 28, 2016, titled "Visual Representation of API Data within the Flow Designer," which is incorporated by reference herein in its entirety.

BACKGROUND

A business or enterprise application is a computer program used by business users to perform various business functions. Business applications are frequently developed when available off-the-shelf software does not completely address the desired functionality. Many business applications are interactive, having a graphical user interface (GUI) into which users can input data, use to submit data queries, use to perform operations, and/to use to view results. Consumer applications are less business focused, instead being focused on the needs of the consumer.

Business and consumer users tend to depend on information technology (IT) personnel to code their applications due to application complexity, and the programming expertise required. Even merely designing an application to pull data from a remote source (e.g., a cloud service) is difficult, typically requiring an experienced software developer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for developing user applications that include workflows, and in particular, for developing workflows that access any number of available services to receive information, may include any number of conditions that are resolved based on the received information, may perform any number of actions based on the received information and conditions, and generate workflow results based on the combination of accessed services and conditions.

In one implementation, a first input control corresponding to a first input parameter is rendered in association with the rendered representation of a workflow step. A developer is enabled to interact with the first input control to select and set a first parameter value for the first input parameter. The first selected parameter value is provided to (as input data) and affects operation of at least one of an application or service associated with the workflow step during operation of the workflow.

In another implementation, a workflow is enabled to be developed that includes push notification functionality. A push notification workflow step is enabled to be selected by a developer for inclusion in a workflow. The push notification workflow step is configured to issue a push notification when encountered in the work flow and to wait for a response before enabling the workflow to continue.

In still another implementation, a workflow saved in a user folder is enabled to be selected for insertion into further workflows, in a similar manner as other workflow steps.

In another implementation, a subscription workflow step may be selected for inclusion in a workflow. The subscription workflow step is configured to wait for output information from a subscribed-to workflow before enabling the workflow containing the subscription workflow step to execute.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
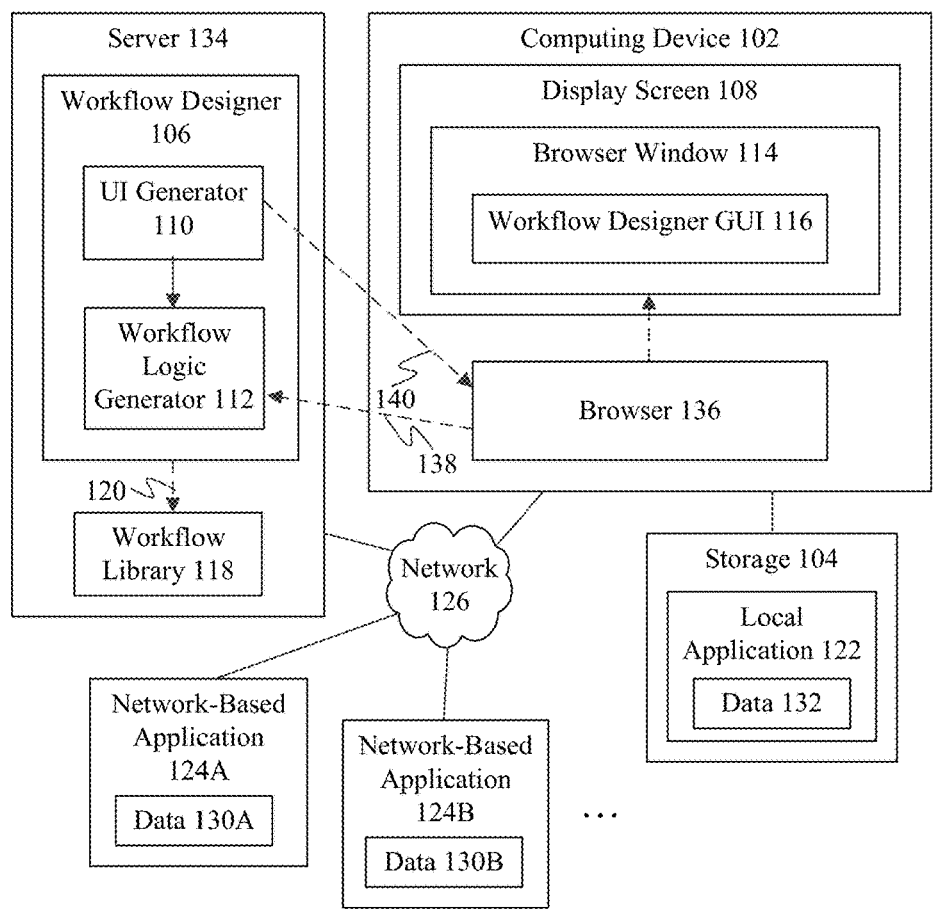
FIG. 1 shows a workflow development system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Development of Workflows

Business applications and consumer applications typically are created when available off-the-shelf software does not completely address desired functionality. Many business and consumer applications are interactive, having a graphical user interface (GUI) into which users can input data, use to submit data queries, use to perform operations, and/to use to view results.

Users tend to depend on information technology (IT) personnel to code their applications due to application complexity and the programming expertise required. For instance, configuring an application to pull data from a source of interest to enterprises or consumers (e.g., data from an SQL (structured query language) database, customer relationship information from Salesforce.com of San Francisco, Calif., social network information from Facebook® operated by Facebook, Inc. of Palo Alto, Calif., or Twitter® operated by Twitter, Inc. of San Francisco, Calif.) is a difficult process.

Embodiments enable easier development of user applications, including business applications and consumer applications. Developers are enabled to develop user applications in the form of workflows without having to be expert programmers.

Example embodiments are described in the following sections for development of user application workflows. In the following description, a person that develops a user application using the techniques described herein is referred to as a "developer," to be distinguished from a person that uses the user application at runtime (a "user" or "end user"). It is noted, however, that a "developer," as referred to herein, does not need to have expertise in computer programming. The embodiments described herein enable application development without special programming skills.

A. Example Workflow Development Embodiments

Development of workflows may be enabled in various ways in embodiments. For instance, FIG. 1 shows a workflow development system 100, according to an example embodiment. As shown in FIG. 1, system 100 includes a computing device 102, storage 104, a first network-based application 124A, a second network-based application 124B, and a server 134. Server 134 includes a workflow designer 106 and a workflow library 118 (e.g., in storage). Workflow designer 106 includes an UI generator 110 and a workflow logic generator 112. Computing device 102 includes a display screen 108 and a browser 136. Storage 104 stores a local application 122. System 100 is described as follows.

Computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 134 may include one or more server devices and/or other computing devices.

Local application 122 in storage 104 is an example of an application accessible by computing device 102 without communicating over a network. Local application 122 may be configured to perform data processing and/or data hosting operations when executed by a processor of computing device 102, and may provide data 132 to workflows created by workflow designer 106 during runtime of those workflows. Local application 122 may be any type of local application/service, such as a database application (e.g., QuickBooks®, a Microsoft® Excel® spreadsheet), a messaging application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102, including numbers in the tens, hundreds, or greater numbers.

First and second network-based applications 124A and 124B are examples of network-based applications, also referred to as "cloud" applications or services. Network-based applications 124A and 124B are accessible by computing device 102 over network 126, may be configured to perform data processing and/or data hosting operations, and may provide data 130A and 130B, respectively, to workflows created by workflow designer 106 during runtime of those workflows. Network-based applications 124A and 124B may each be any type of web accessible applications/services, such as database applications, social networking applications, messaging applications, financial services applications, news applications, search applications, web-accessible productivity applications, cloud storage and/file hosting applications, etc. Examples of such applications include a web-accessible SQL (structured query language) database, Salesforce.com™, Facebook®, Twitter®, Instagram®, Yammer®, LinkedIn®, Yahoo!® Finance, The New York Times® (at www.nytimes.com), Google search, Microsoft® Bing, Google Docs™, Microsoft® Office 365, Dropbox™, etc. Although FIG. 1 shows two network-based applications, any number of network-based applications may be accessible over network 126, including numbers in the tens, hundreds, thousands, or greater numbers.

Note that data 128, data 130A, data 130B, and data 132 may each include any type of data, including messages, notifications, calculated data, retrieved data, and/or any other type of information requested or usable by a workflow.

Computing device 102 and server 134 may each include at least one network interface that enables communications with each other and with network-based applications 124A and 124B over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN), a personal area network (PAN), and/or a combination of communication networks, such as the Internet.

Workflow designer 106 is configured to be operated/interacted with to create workflows. For instance, a developer may access workflow designer 106 by interacting with an application at computing device 102 capable of accessing a network-based application, such as browser 136. The developer may use browser 136 to traverse a network address (e.g., a uniform resource locator) to workflow designer 106, which invokes a workflow designer GUI 116 (e.g., a web page) in a browser window 114. The developer is enabled to interact with workflow designer GUI 116 to develop a workflow.

As shown in FIG. 1, workflow designer 106 includes UI generator 110 and workflow logic generator 112. UI generator 110 is configured to transmit workflow GUI information 140 (e.g., one or more web pages, image content, etc.) to browser 136 to be displayed as workflow designer GUI 116 in display screen 108 in browser window 114. Workflow designer GUI 116 may be interacted with by the developer to select and configure workflow steps into a workflow. For example, the developer may insert and sequence a plurality of workflow steps in workflow designer GUI 116, with one or more of the steps being associated with a local or network-based application. Browser 136 stores the selected workflow steps, corresponding configuration information, and workflow step sequence information as constructed workflow information 138. Constructed workflow information 138 is transmitted to workflow logic generator 112 at server 134. Workflow logic generator 112 generates workflow logic 120 based on the assembled workflow represented by constructed workflow information 138. The workflow represented by workflow logic 120 may subsequently be invoked at runtime by an end user.

During runtime of the workflow, workflow logic 120 may invoke operation of one or more local or network-based applications associated with the workflow steps of workflow logic 120. Each workflow step may receive input data 128 from workflow designer GUI 116, data 132 from local application 122, data 130A or data 130B from one or both of local or network-based applications 124A and 124B, and/or data from another workflow step of workflow logic 120.

Figure 2:
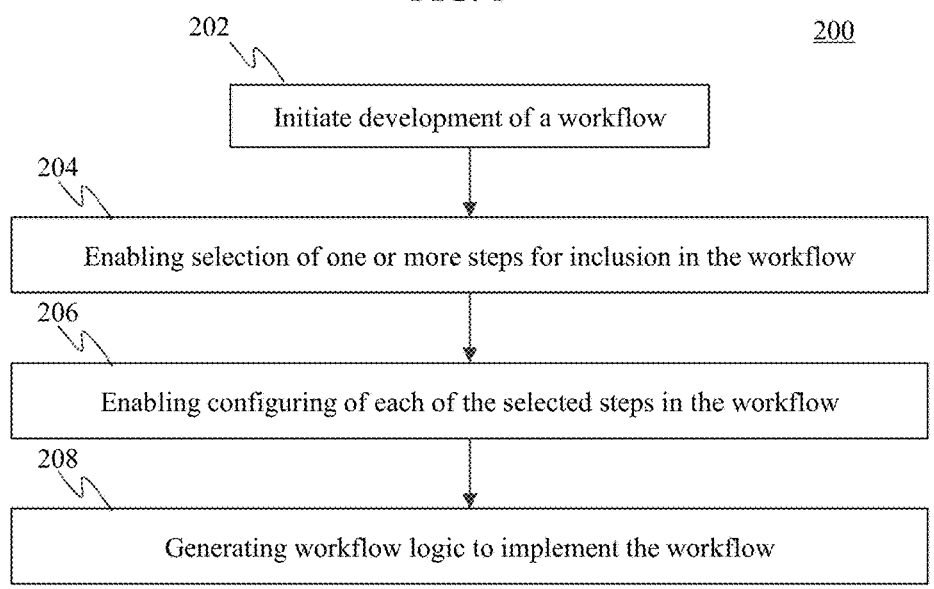
FIG. 2 shows a flowchart providing a process for development of workflows, according to an example embodiment.
Figure 3:
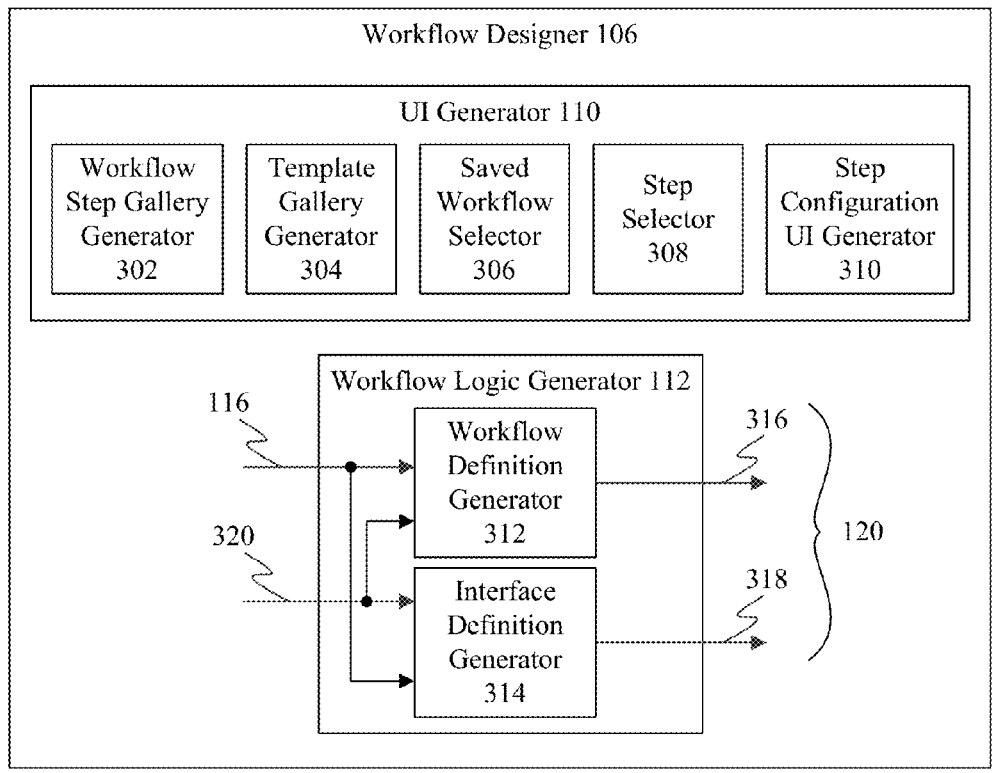
FIG. 3 shows a block diagram of a workflow designer application, according to an example embodiment.
Figure 4:
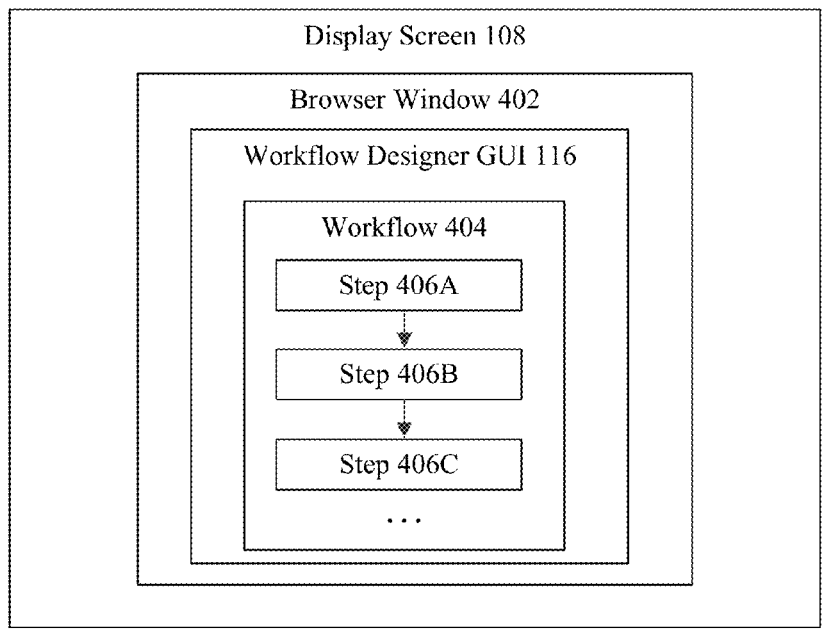
FIG. 4 shows a block diagram of a display screen showing a browser window displaying an exemplary workflow, according to an example embodiment.

Workflow designer 106 may operate in various ways, to enable development of a workflow. For instance, in embodiments, workflow designer 106 may operate according to FIG. 2. FIG. 2 shows a flowchart 200 providing a process for development of workflows, according to an example embodiment. Flowchart 200 and workflow designer 106 are described as follows with respect to FIGS. 3 and 4. FIG. 3 shows a block diagram of workflow designer 106, according to an example embodiment. As shown in FIG. 3, workflow designer 106 includes UI generator 110 and workflow logic generator 112. UI generator 110 includes a workflow step gallery generator 302, a template gallery generator 304, a saved workflow selector 306, a step selector 308, and a step configuration UI generator 310. Workflow logic generator 112 includes a workflow definition generator 312 and an interface definition generator 314. FIG. 4 shows a block diagram of display screen 108, illustrating an example of workflow designer GUI 116 displayed in browser window 402 on display screen 108, according to an example embodiment Flowchart 200 of FIG. 2 begins with step 202. In step 202, development of a workflow is initiated. For example, in an embodiment, workflow designer 106 may be invoked by a developer interacting with browser 136 at computing device 102. The developer may traverse a link or other network address directed to workflow designer 106 at server 134, to invoke workflow designer 106, causing workflow designer 106 to provide workflow GUI information 140 (e.g., one or more web pages, image content, etc.) to browser 136 to be displayed as workflow designer GUI 116 in display screen 108 in browser window 114. Once invoked, the developer may open an existing workflow for further development, or may begin a new workflow.

For instance, a displayed page of workflow designer GUI 116 may display a gallery or workflow steps generated by workflow step gallery generator 302. The workflow step gallery includes a plurality of selectable workflow steps. The workflow steps may be stored in workflow library 118, and accessed for display by workflow designer GUI 116. The developer may select one of the workflow steps for inclusion in their workflow, and may proceed with configuring the contents of the workflow step, and/or may add additional workflow steps to continue generating their workflow.

For example, as shown in FIG. 4, workflow step gallery generator 302 may enable steps 406A, 406B, and 406C to be selected for insertion into a workflow 404 being assembled in workflow designer GUI 116. Any number of workflow steps may be inserted.

In another example, a displayed page of workflow designer GUI 116 may display a template gallery generated by template gallery generator 304. The template gallery includes a plurality of selectable workflow templates, which each include one or more workflow steps pre-connected for operation. The workflow templates may be stored in workflow library 118, and accessed for display by workflow designer GUI 116. The developer may select one of the workflow templates for inclusion in their workflow, and may proceed with configuring the contents of the workflow template, and/or may add additional workflow steps to the workflow steps of the workflow template to generate a more complex workflow.

For instance, in the example of FIG. 4, steps 406A and 406B may have been included in a workflow template placed in workflow 404, step 406C may have been subsequently added (e.g., from a workflow step gallery).

In another example, saved workflow selector 306 may enable the developer to select an existing, saved workflow to be opened for further editing in a displayed page of workflow designer GUI 116. The saved workflows may be stored in workflow library 118 or elsewhere. For example, saved workflow selector 306 may display a list of saved workflows, may enable navigation to a saved workflow, and/or may provide another mechanism for selecting a saved workflow for editing. The developer may then proceed with further configuring the contents of the workflow, and/or may add additional workflow steps to the workflow steps of the workflow to generate a more complex workflow.

In step 204, selection of one or more steps for inclusion in the workflow is enabled. When a developer is editing a workflow, step selector 308 may enable the developer to select further workflow steps for inclusion in the workflow, and to order the steps. The workflow steps may be accessed by step selector 308 in workflow library 118. For instance, step selector 308 may display a pull-down menu of workflow steps, a scrollable and/or searchable list of available workflow steps, or may provide the workflow steps in another manner, and may enable the developer to select any number of workflow steps from the list for inclusion in the workflow.

In one example, step selector 308 may enable a developer to select a step that is associated with a local application, such as Microsoft® Outlook®, or a network-based application, such as Facebook®. Step selector 308 enables the steps to be chained together in a sequence, optionally with conditional steps, for inclusion in workflow logic 120.

In step 206, each of the selected steps in the workflow is enabled to be configured. In an embodiment, step configuration UI generator 310 enables configuration of each workflow step in a workflow. Step configuration UI generator 310 accesses each selected workflow step in workflow library 118 to determine the configuration of the workflow step, including all of its input parameters and any other selections or information that a user or developer needs to provide to the workflow step to configure it For example, step configuration UI generator 310 may generate a UI that enables the developer to type, navigate to, use a pull-down menu, or otherwise enter input data into a text input box or other data input element (e.g., input parameter) of a workflow step. The developer may configure an output of a prior step to be input data for a workflow step. Step configuration UI generator 310 may enable data or other objects to be copied and pasted, dragged and dropped, or otherwise entered copied from elsewhere into data input boxes of a workflow step.

In step 208, workflow logic to implement the workflow is generated. In an embodiment, workflow logic generator 112 is configured to package and generate workflow logic 120 based on constructed workflow information 138 when the developer indicates the workflow is finished, such as when the developer interacts with workflow designer GUI 116 to save the workflow. As shown in FIG. 3, workflow logic generator 112 receives constructed workflow information 138. Constructed workflow information 138 indicates which workflow steps have been inserted into the workflow, their input parameter values, and their sequencing. Workflow logic generator 112 also receives selected workflow logic 320, which is the workflow logic for each workflow step of the workflow as indicated in constructed workflow information 138. In one example, workflow logic generator 112 retrieves workflow logic from workflow library 118 for each workflow step indicated in constructed workflow information 138, to receive selected workflow logic 320. Workflow logic generator 112 generates workflow logic 120 for the workflow based on constructed workflow information 138 and selected workflow logic 320. For example, workflow logic generator 112 may generate workflow logic 120 in the form of an executable file, a zip file, or other form, which may be executed in a standalone fashion, may be executed in a browser, or may be executed in another manner, depending on the particular type of workflow being generated.

With reference to FIG. 3, workflow logic generator 112 may generate workflow logic 120 to include at least two components (e.g., files): workflow definition information 316 and interface definition information 318. Workflow definition information 316 includes information that defines the sequence and operation of the workflow of workflow logic (e.g., lists the workflow step operations and their ordering/sequencing) and includes the parameter values for the workflow. For example, workflow definition information 316 may be generated to contain information in the format of a JSON (JavaScript object notation) file or in another form. Interface definition information 318 includes information that defines the interfaces/parameters (e.g., inputs and outputs) of the workflow steps of the workflow. For example, interface definition information 318 may be generated to contain information in the format of a Swagger (a specification for REST (representational state transfer) web services) file or in another form. For instance, each workflow step may be represented in workflow library 118 as API (application programming interface) metadata in Swagger format, defining what are the necessary inputs and outputs (parameters) of the workflow step, such that a service may be accessed according to the API definition. In such an implementation, the operations in the workflow definition information 316 refer to the corresponding API metadata in the interface definition information 318 to give a complete structure of a generated workflow (e.g., each sequenced workflow step/operation defined with parameter values in the workflow definition information 316 has a corresponding API, which is defined in the interface definition information 318).

Accordingly, flowchart 200 and workflow designer 106 enable a developer to create workflows. FIGS. 5-8 shows views of an exemplary workflow in various phases of development using a development GUI, according to example embodiments. For example, each of FIGS. 5-8 show browser window 402 displaying a corresponding view of workflow designer GUI 116 being used to develop a workflow.

Figure 5:
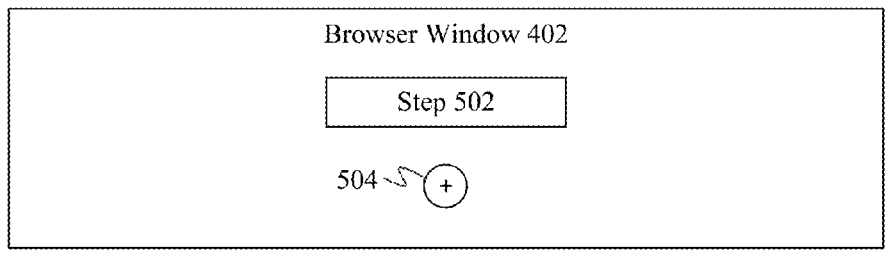
FIGS. 5-8 shows views of an exemplary workflow in various phases of development using a development GUI, according to example embodiments.

For instance, FIG. 5 shows browser window 402 including a workflow step 502 and an add interface 504. Workflow step 502 was selected by a developer to be a first step in a workflow. Add interface 504 (e.g., a button or other GUI control) may be interacted with by the developer to add further workflow steps to the workflow.

As described above, a developer is enabled to select workflow step 502 from a list or library of steps, a gallery of workflow steps, a template gallery, or elsewhere. A list, library, or gallery may include any number of workflow steps. The workflow steps may be associated with network-based applications mentioned elsewhere herein or otherwise known (e.g., Dropbox™), and/or with local applications mentioned elsewhere herein or otherwise known (e.g., Microsoft® Outlook®). Each workflow step is configured for plug-and-place into the workflow. Each workflow step is configured with the appropriate logic and/or interface(s) to perform its respective function(s), which may include communicating with a local or remote application. For instance, a workflow step may be configured to transmit a query to an application (e.g., a search query to a search engine, a database query to a database, a request for data from a social networking application, etc.), being pre-configured how to properly transmit and format such a request to the application. The workflow step may be configured to receive a response to the request, being pre-configured how to parse the response for desired response data. As such, a developer of a workflow does not need to know how to write program code in a programming language, to interface with complex application interfaces (e.g., application programming interfaces (APIs)), or to understand network communication protocols, as the workflow steps are already setup. When a workflow step is plugged into workflow logic by a developer, the developer configures the inputs to the workflow step (as described below), and the otherwise pre-configured workflow step handles any communications with other applications.

Figure 6:
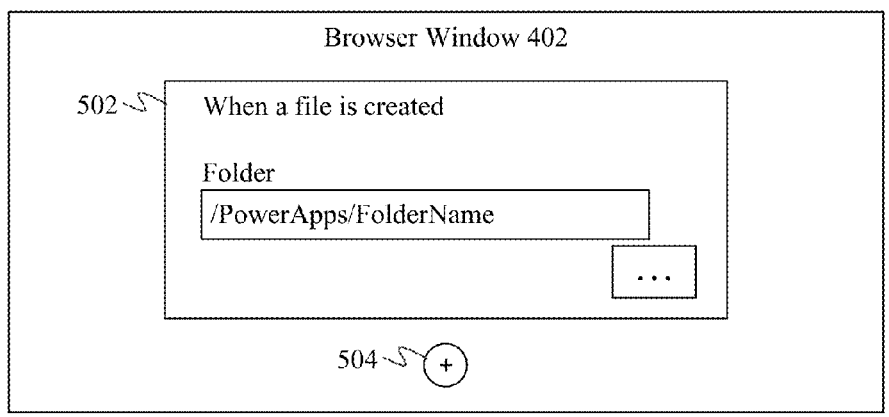

In FIG. 6, the developer has interacted with step 502 (e.g., by mouse click, etc.) to cause step configuration UI generator 310 to generate a UI for configuration of step 502. For instance, in the example of FIG. 6, workflow step 502 is configured to monitor for a file to be created in a particular folder identified by the developer in a text input box (e.g., by typing, clicking on a navigator indicated by " . . . ", etc.). When workflow step 502 determines a file is added to the indicated folder, a workflow step following workflow step 502 is triggered. Thus, workflow step 502 may be considered a trigger step in this example.

Figure 7:
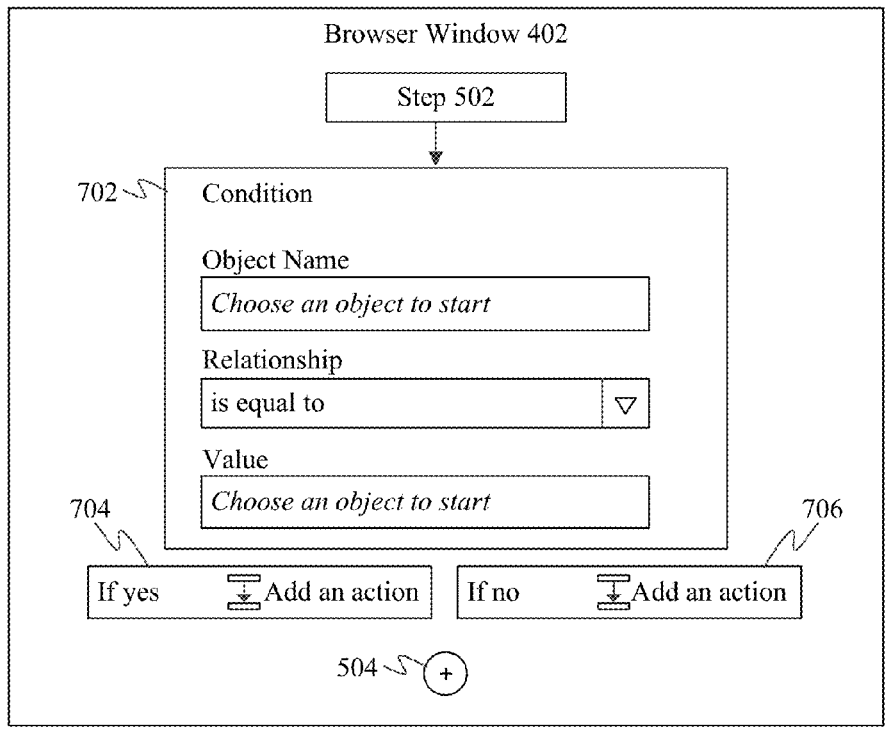

For instance, in FIG. 7, the developer interacted with add interface 504 to select a next workflow step 702. In an embodiment, interaction with add interface 504 invokes step selector 308 in FIG. 3, which enables the developer to select a workflow step. In the example of FIG. 7, workflow step 702 is a conditional step. In embodiments, logical elements may be selected for inclusion in a workflow, including arithmetic logic (e.g., summers, multipliers, etc.), conditional logic, etc., that operate based on variable values determined in earlier workflow steps. The condition of workflow step 702 enables the workflow to fork based on the determination of a condition (e.g., a variable value). The condition may include an object name, a relationship (e.g., a logical relationship, such as equal to, includes, not equal to, less than, greater than, etc.), and a value, which are all defined by the developer interacting with workflow step 702. Corresponding action steps may be performed depending on which way the workflow forks based on the condition.

In one illustrative example of FIG. 7, the object name may be selected (e.g., from a list of possibilities) to be a name of the created file of workflow step 502, the relationship may be "contains" (e.g., selected by a pull-down menu) and the value may be "dummyfile" (e.g., typed in by the developer). The condition evaluates to a "yes" condition if the file name contains "dummyfile," which invokes first action workflow step 704, and evaluates to "no" condition if the file name does not contain "dummyfile," which invokes second action workflow step 706. An action may be defined for one or both of the "yes" and "no" action workflow steps 704 and 706 by the developer, if desired.

Figure 8:
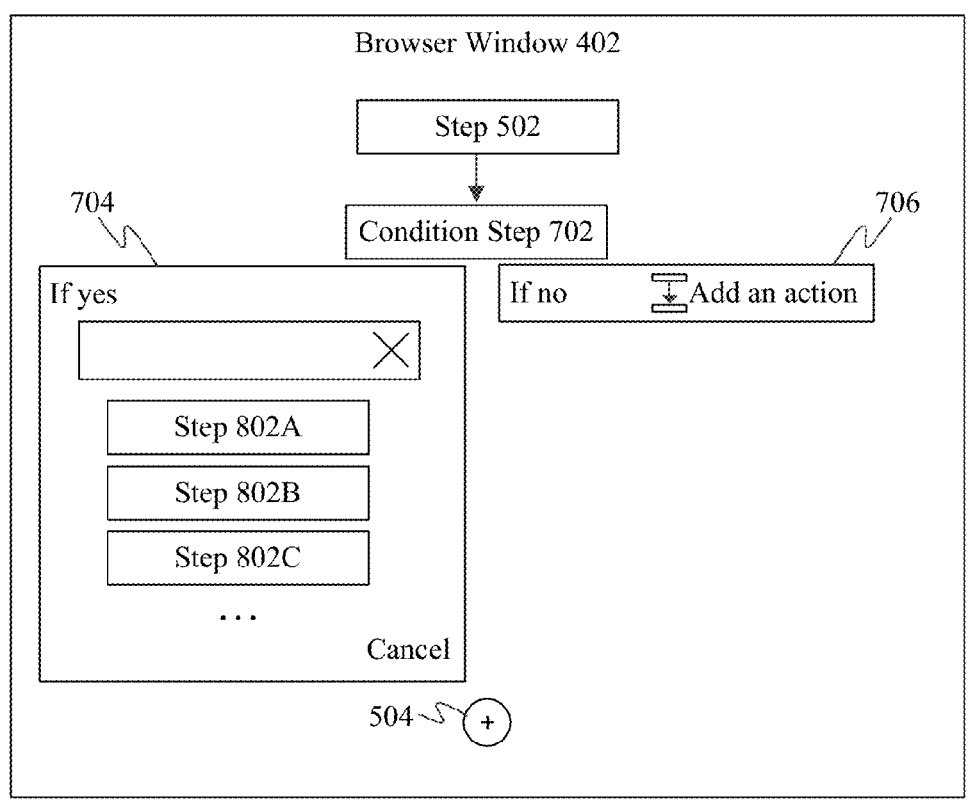

For example, in FIG. 8, the developer interacts with action workflow step 704 to define an action. In this example, the developer is defining action workflow step 704 by selecting a workflow step via step selector 308. As shown in FIG. 8, a list of workflow steps 802A, 802B, 802C is displayed, from which the developer can select a workflow step (e.g., by mouse click, etc.) to be performed for action workflow step 704. The workflow step can be a trigger step, an action step, or a condition step. After selecting the workflow step, the developer may configure the workflow step as described above. Furthermore, the developer may configure an action for workflow step 706, may add further workflow steps, etc., eventually being enabled to save the workflow.

It is noted that in some embodiments, a workflow step, such as first workflow step 502, may require credentials (e.g., a login and password) to access indicated data (e.g., to access a file at the location indicated in the text input box in FIG. 6). As such, the developer may be requested to provide credential information in association with first workflow step 502 so that when first workflow step 502 is performed during runtime, the data may be accessed. Alternatively, the credentials may be requested of a user during runtime.

B. Example Runtime Embodiments

According to embodiments, end users may execute workflows developed as described herein. During operation, an end user may interact with a GUI of the workflow, which may lead to workflow logic being executed. The workflow logic may execute locally (e.g., in a browser) and/or at a remote service (in "the cloud"). The workflow logic may access data of one or more applications, local or network-accessible, as was configured by the developer. Accordingly, the workflow performs its intended functions.

Figure 9:
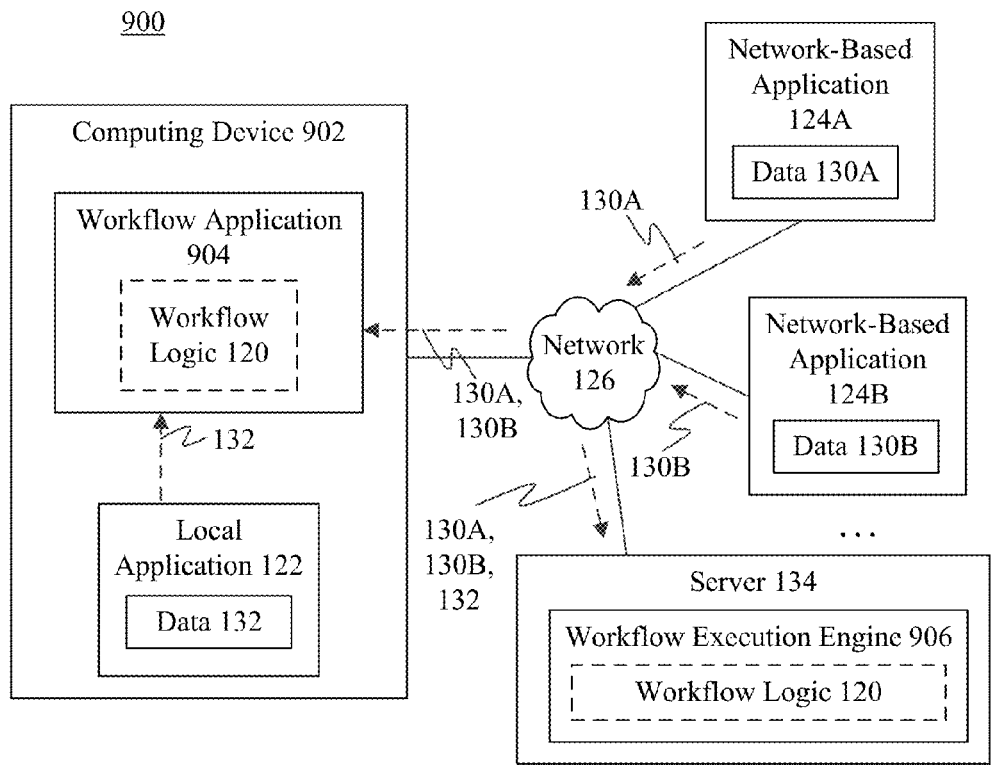
FIG. 9 shows a block diagram of a system for operating a workflow, according to an example embodiment.

FIG. 9 shows a block diagram of a system 900 for operating a workflow that includes one or more workflow steps, according to an example embodiment. As shown in FIG. 9, system 900 includes a computing device 902, first network-based application 124A, second network-based application 124B, and server 134. Computing device 902 includes a workflow application 904. Server 134 includes a workflow execution engine 906. System 100 is described as follows.

First and second network-based applications 124A and 124B are each optionally present, depending on the configuration of workflow logic 120. Further network-based applications may be present, depending on the configuration of workflow logic 120.

Computing device 902 may be any type of stationary or mobile computing device described herein or otherwise known. Computing device 902 is configured to communicate with first and second network-based applications 124A and 124B and server 134 over network 126.

In one embodiment, workflows are executed at server 134 by workflow execution engine 906, and workflow application 904 is a UI application that enables a user at computing device 902 to interact with the executing workflows, such as by selecting and invoking the workflows, receiving communications from the executing workflows (e.g., messages, alerts, output data, etc.), providing requested input data to executing workflows, etc. In such an embodiment, workflow application 904 may be a workflow UI application associated with workflow execution engine 906 (e.g., workflow application 904 may be an extension of workflow execution engine 906) that may operate separate from or within a browser at computing device 902, or may be configured in another way. As shown in FIG. 9, workflow execution engine 906 may load workflow logic 102 for a selected workflow (e.g., selected from a workflow library by a user), and may execute workflow logic 102 to execute the workflow.

In another embodiment, workflow application 902 may be configured to execute workflows at computing device 902. For instance, an end user of computing device 902 may interact with a user interface of workflow application 902 to select and invoke a particular workflow (e.g., selected from a workflow library). In such embodiments, workflow logic 120 may operate separate from or in a browser at computing device 902, or may be configured in another way. As shown in FIG. 9, workflow application 904 may load workflow logic 120 for a selected workflow (e.g., selected from a workflow library by a user), and may execute workflow logic 120 to execute the workflow.

In another embodiment, a first portion of workflow logic 120 may operate in workflow application 904 at computing device 902 and a second portion of workflow logic 120 may operate in workflow execution engine 906 at server 134 and/or elsewhere.

Figure 10:
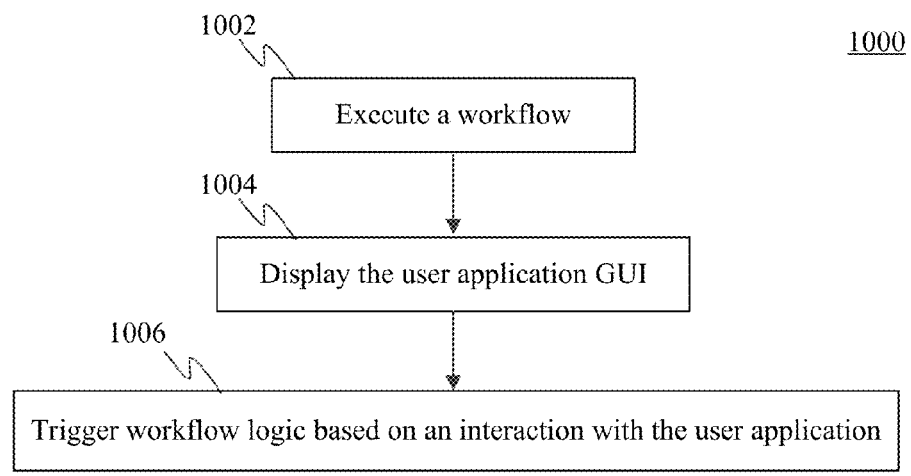
FIG. 10 shows a flowchart providing a process for executing a user application that includes one or more workflows, according to an example embodiment.

FIG. 10 shows a flowchart 1000 providing a process for executing workflow logic 120 of a workflow, according to an example embodiment. Flowchart 1000 is described as follows with respect to system 900 of FIG. 9 for illustrative purposes.

Flowchart 1000 begins with step 1002. In step 1002, the workflow is executed. In an embodiment, an end user at computing device 902 may cause workflow logic 120 to be executed, such as by command line, by clicking/tapping or otherwise interacting with an icon representing the application, by selection in a browser, or in another manner. As described above, workflow logic 120 may execute in workflow application 904 at computing device 902 and/or in workflow execution engine 906 at server 134. When executed, the workflow steps of workflow logic 120 are performed in the configured sequence. Accordingly, one or more of the workflow steps may make calls to corresponding applications/services to perform their functions, such as local application 122 (to return data 132), network-based application 124A (to return data 130A), network-based application 124B (to return data 130B), and/or other applications, local or network-based.

In step 1004, the workflow GUI is displayed. Step 1004 is optional, as in some embodiments, a GUI is not displayed for a workflow. In an embodiment, the GUI may be displayed by workflow application 904 at computing device 902. When displayed, the user may interact with the GUI by reviewing displayed data (e.g., from a file, database record, spreadsheet, or other data structure read by the workflow), by entering data into the GUI (e.g., by typing, by voice, etc.), and/or by interacting with one or more controls displayed by the GUI.

In step 1006, workflow logic is triggered based on an interaction with the workflow. Step 1006 is optional in cases where one or more workflow steps of a workflow require input from a user. In such cases, the user interacts with a control in a GUI of workflow application 904 associated with a workflow step of workflow logic 120 to provide information that triggers logic of the workflow step to operate.

In this manner, workflow logic 120 performs its functions, such as processing orders, tracking information, generating messages, processing documents to generate tasks or information, collecting feedback, and/or any other functions.

C. Example Embodiments for Visual Representation of API Data within the Workflow Designer According to embodiments, workflow designer 106 enables a workflow step to be visualized for developers, including automatically determining and displaying the input parameters for the workflow steps for the developer to fill with parameter values. Workflow designer 106 may perform this function by analyzing interface definition information associated with the workflow step (e.g., a file defining an API for the workflow step) to automatically determine and display the input parameters for a displayed workflow step. Workflow designer 106 may dynamically determine lists of selectable input values for the input parameters, and may also dynamically determine further input parameters for the workflow step based on one or more parameter values selected by the developer.

As described above, interface definition information 318 (e.g., a Swagger file) may describe a set of APIs for workflow logic 120. However, Swagger is static about input parameters and output parameters, meaning that the input and output parameters of an API defined in Swagger are set (not variable). For instance, a particular API may have input parameter 1, input parameter 2, and input parameter 3 as three input parameters, and output parameter 1 as a sole output parameter. Conventionally, these four parameters for the API are static, and thus used every time the API is accessed.

In embodiments, developers are enabled to extend the lists of input parameters and output parameters. This is accomplished by enabling a developer of an API corresponding to a workflow step to extend the API to indicate where inputs can be pulled from, which may include a dynamic list. Furthermore, the input and/or output parameters may change based on particular selected input parameter values.

Figure 11:
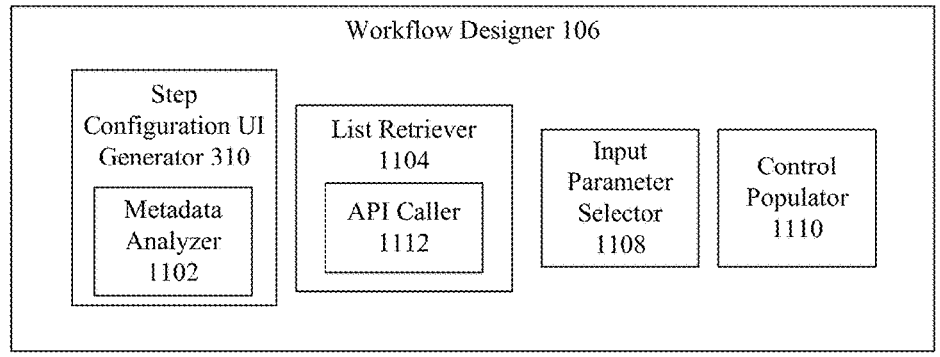
FIG. 11 shows a block diagram of workflow designer configured to analyze metadata to enable visualization of parameters of a workflow step, according to an example embodiment.

For example, FIG. 11 shows a block diagram of workflow designer 106 configured to analyze metadata to enable visualization of a workflow step, according to an example embodiment. Workflow designer 106 in FIG. 11 is an example of workflow designer 106 shown in FIGS. 1 and 3. As shown in FIG. 11, workflow designer 106 may include step configuration UI generator 310, a list retriever 1104, an input parameter selector 1108, and a control populator 1110. Step configuration UI generator 310 includes a metadata analyzer 1102. List retriever 1104 includes an API caller 1112. Workflow designer 106 of FIG. 11 is described as follows.

Figure 12:
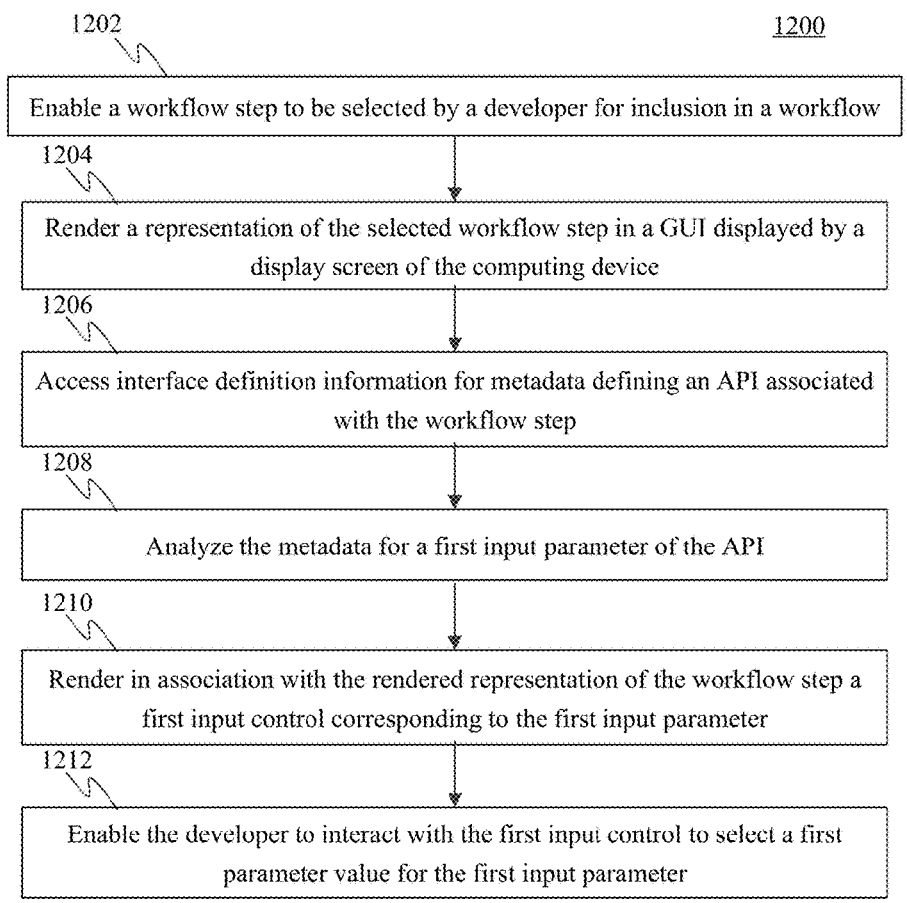
FIG. 12 shows a flowchart providing a process for enabling a developer to configure input parameter values for a workflow, according to an example embodiment.

In particular, workflow designer 106 is described with respect to FIG. 12. FIG. 12 shows a flowchart 1200 providing a process for enabling a developer to configure input parameter values for a workflow, according to an example embodiment. In an embodiment, workflow designer 106 may operate according to flowchart 1200. Note that not all steps of flowchart 1200 need be performed in all embodiments.

Flowchart 1200 begins with step 1202. In step 1202, a workflow step is enabled to be selected by a developer for inclusion in a workflow. Example techniques for enabling a developer to select a workflow step for inclusion in a workflow are described above, including with respect to step 204 of flowchart 200 (FIG. 2). For instance, step selector 308 of FIG. 3 may be interacted with by a developer to select a workflow step, and to insert the selected workflow step into a workflow, as described above (e.g., with respect to FIG. 7). Alternatively, a developer may select a workflow step from a gallery (e.g., as described above with respect to workflow step gallery generator 302 of FIG. 3), may select a template that includes workflow steps (e.g., as described above with respect to template gallery generator 304 of FIG. 3), or may select and insert a workflow step into a workflow in another manner.

In step 1204, a representation of the selected workflow step is rendered in a graphical user interface (GUI) displayed by a display screen of the computing device. As described above, such as with respect to FIGS. 5-7, selected workflow steps may be displayed (rendered) in a GUI, such as a GUI rendered by a browser, when selected by the developer using step selector 308 or in another manner. In this manner, the developer can view and arrange the workflow steps into a workflow.

Figure 13:
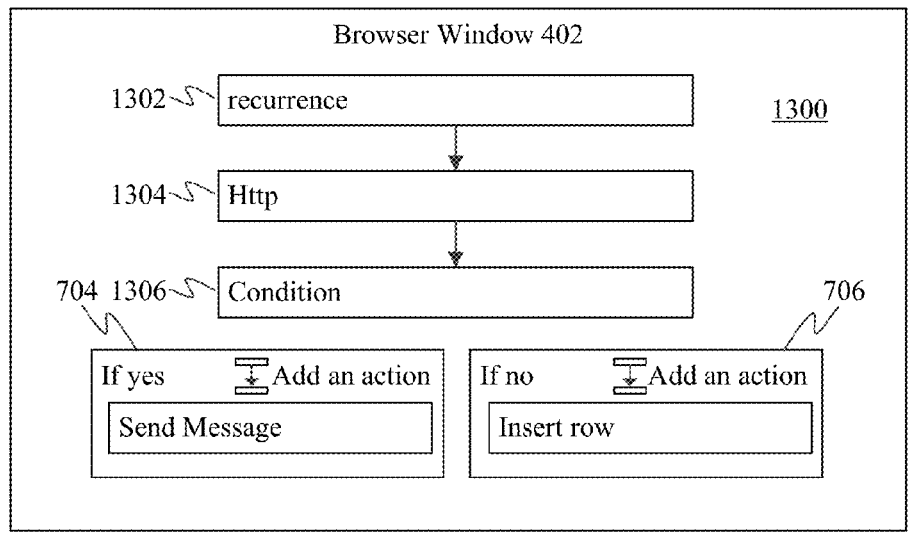
FIG. 13 shows a block diagram view of a workflow development GUI prior to configuring input parameter values, according to an example embodiment.

Reference is made to FIG. 13 for purposes of illustration. FIG. 13 shows a block diagram view of a browser window 402 displaying a workflow development GUI 1300, according to an example embodiment. Browser window 402 is displayed in a display screen of a computing device, such as display screen 108 in FIG. 4. In the example of FIG. 13, a developer has selected and inserted several example workflow steps into a workflow. The workflow steps are rendered in browser window 402, including workflow steps 1302 and 1304, condition workflow step 1306, and first and second action workflow steps 704 and 706. Workflow step 1302 is a "recurrence" step, workflow step 1304 is an "Http" step, first action workflow step 704 is a "send message" step, and second action workflow step 706 is an "insert row" step. Steps 1302, 1304, 1306, 704, and 706 may be selected and rendered in a GUI in any manner.

In step 1206, interface definition information is accessed for metadata defining an API associated with the workflow step. As described above, each workflow step stored in workflow library 118 has corresponding workflow definition information and interface definition information, which may have the form of a pair of files (e.g., a JSON file and a Swagger file, respectively). In an embodiment, metadata analyzer 1102 of FIG. 11 may access the interface definition information defining an API for the workflow step selected in step 1202, which may include metadata defining the input and output parameters of the workflow step.

In step 1208, the metadata is analyzed for a first input parameter of the API. In an embodiment, metadata analyzer 1102 of FIG. 11 may be configured to parse the interface definition information of the workflow step to identify each input parameter in the interface definition information in any manner, such as by a marker, a tag, a particular alphanumeric sequence, one or more predetermined symbols, etc., as would be apparent to persons skilled in the relevant art(s).

In step 1210, a first input control corresponding to the first input parameter is rendered in association with the rendered representation of the workflow step. In an embodiment, as described above, step configuration UI generator 310 is configured to render, in association with the rendered representation of the workflow step selected in step 1202, an input control corresponding to each input parameter determined in step 1208. The input control type (e.g., a text box, a file navigator, a pull down menu, etc.) for an input parameter may be indicated in the interface definition information, in association with the input parameter, as a parameter of the input parameter or in any other manner. If no input control type is indicated for an input parameter, a default input control type may be selected by step configuration UI generator 310, such as a text box.

Note that step 1210 may be performed automatically by step configuration UI generator 310, or in response to developer input. For example, the developer may interact with a user interface element provided in association with the workflow step selected in step 1202, or otherwise presented in the workflow GUI (e.g., a single UI element for all workflow steps, etc.), to cause the input control to be rendered in association with the workflow step.

Figure 14:
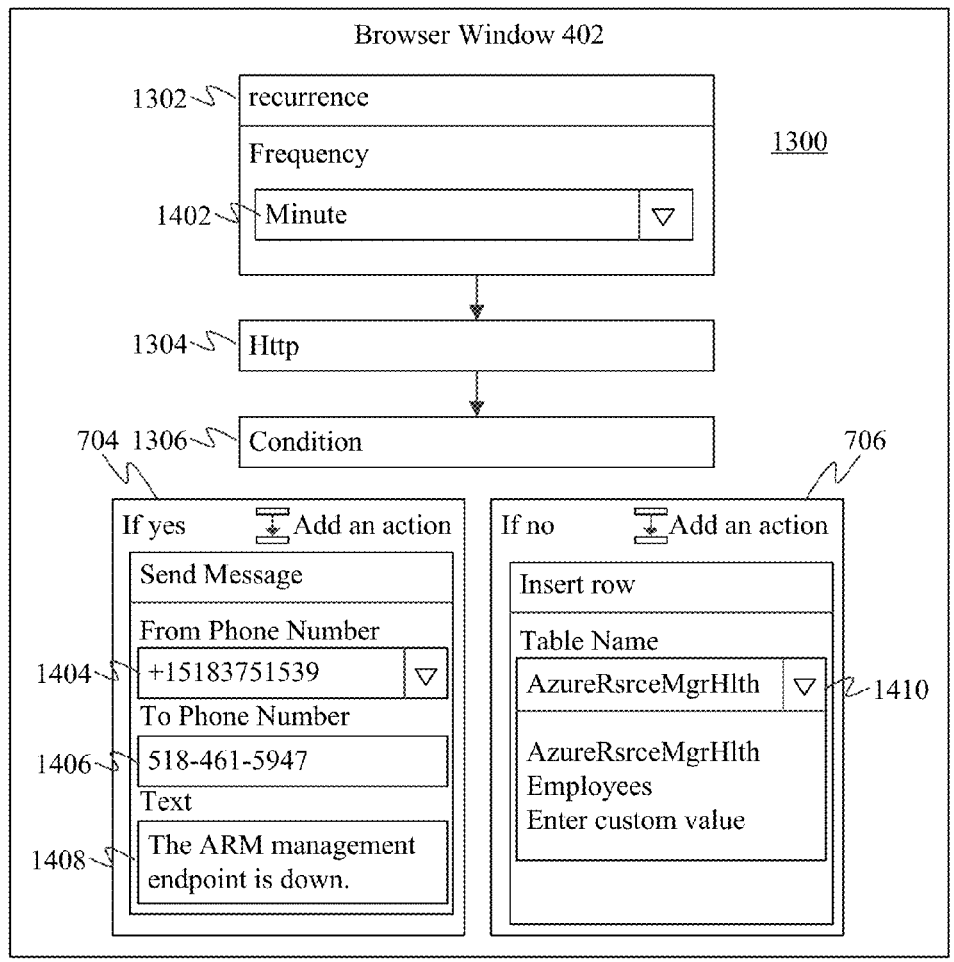
FIG. 14 shows a block diagram view of the workflow development GUI of FIG. 13, where example input parameter values have been selected, according to an example embodiment.

Continuing the example of FIG. 13, FIG. 14 shows a block diagram view of workflow development GUI 1300, where several input parameters are rendered with corresponding input controls, according to an example embodiment. In an embodiment, step configuration UI generator 310 selected the input controls for display based on an analysis of the interface definition information files associated with each workflow step. As shown in FIG. 14, a first input control 1402, which is a pull down menu labeled "Frequency", is rendered for workflow step 1302. Workflow step 704 includes three rendered input controls 1404, 1406, and 1408 corresponding to three input parameters, shown as "From Phone Number" (pull down menu), "To Phone Number" (text box), and "Text" (text box). Workflow step 706 includes an input control 1410, which is a pull down menu labeled "Table Name, and as described further below, may include further input parameters/input controls based on a selection made in input control 1410.

In step 1212, the developer is enabled to interact with the first input control to select a first parameter value for the first input parameter. In an embodiment, step configuration UI generator 310 is configured to enable the developer to interact with the input control rendered in step 1210 for the workflow step selected in step 1202 to select a parameter value for the input parameter. For instance, for a text box, the developer is enabled to type (or speak using voice input, etc.) to fill in the text box with a parameter value. For a pull down menu, the developer is enabled to invoke the menu and select a parameter value displayed in the menu. For a file navigator, the developer is enable to interact invoke the file navigator to navigate to and select a file, table, or other object to be the parameter value.

For example, as shown in FIG. 14, the developer interacted with the pull down menu of first input control 1402 rendered for workflow step 1302 to select a parameter value of "Minute." With respect to workflow step 704, the developer interacted with the pull down menu of input control 1404 to select a first phone number as the corresponding parameter value, with the text box of input control 1406 to input a second phone number as the corresponding parameter value, and with the text box of input control 1408 to input desired text as the corresponding parameter value.

Note that in embodiments, the list of selectable parameter values of a pull down menu (or other GUI element that enables selection from multiple values) for a workflow step may be obtained dynamically. In other words, rather than obtaining the list of selectable parameter values from within the API interface definition information file for the workflow step, the list of parameter values may be retrieved from elsewhere. In this manner, the list does not have to be static (limited to the values stored in the interface definition file), but instead can dynamic, being changeable based on the contents of the list at the location it is maintained.

Figure 15:
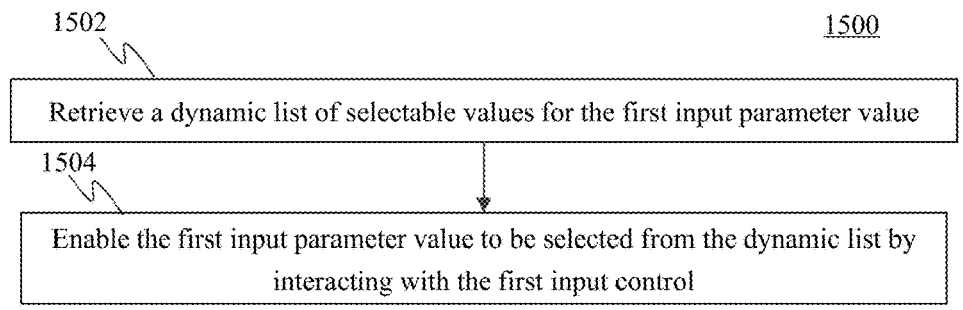
FIG. 15 shows a flowchart providing a process for enabling dynamic selection of input parameter values for a workflow input parameter, according to an example embodiment.

For instance, FIG. 15 shows a flowchart 1500 providing a process for enabling dynamic selection of input parameter values for a workflow input parameter, according to an example embodiment. Flowchart 1500 is described as follows.

Flowchart 1500 begins with step 1502. In step 1502, a dynamic list of selectable values for the first input parameter value is retrieved. In an embodiment, list retriever 1104 of FIG. 11 is configured to retrieve a dynamic list of selectable values for an input parameter value. For instance, when a developer interacts with a pull down menu or other UI element to display a list of selectable parameter values, step configuration UI generator 310 may signal list retriever 1104 to retrieve the list of parameter values. List retriever 1104 may determine a location of the list based on an identity or address (for an entity that maintains the list) stored in association with metadata for the workflow step in the interface definition information file for the workflow step or for the workflow as a whole.

Figure 16:
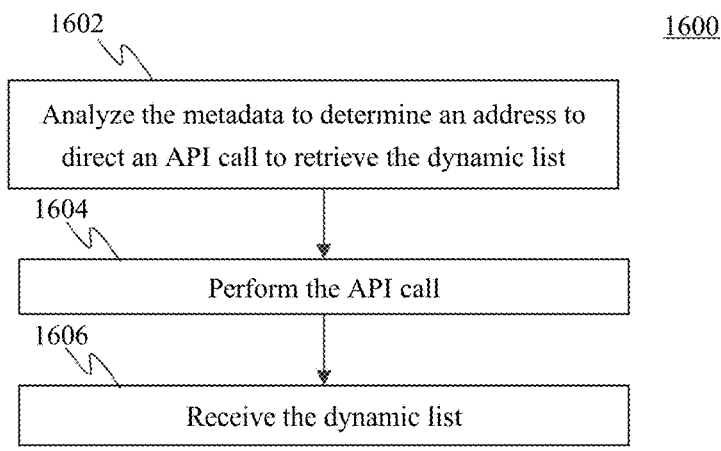
FIG. 16 shows a flowchart providing a process for making an API call for a list of input parameter values that may be selected from to choose a workflow input parameter value, according to an example embodiment.

For example, in an embodiment, step 1502 may be performed by list retriever 1104 according to FIG. 16. FIG. 16 shows a flowchart 1600 providing a process for making an API call for a list of input parameter values for a workflow input parameter, according to an example embodiment.

In step 1602 of flowchart 1600, the metadata is analyzed to determine an address to direct an API call to retrieve the dynamic list. In an embodiment, list retriever 1104 may parse metadata in the interface definition information file for the workflow step or for the workflow as a whole to determine an address. The address may be identified in the file by a parameter name (e.g., "dynamiclistaddress") associated with the API for the workflow step. The address may have any form, including being a URL (uniform resource locator) or other type of URI (uniform resource identifier) or web address, a server name, a directory path, etc.

In step 1604, the API call is performed. In an embodiment, API caller 1112 of list retriever 1104 is configured to perform an API call on behalf of list retriever 1104, in a manner as would be known to persons skilled in the relevant art(s). The API call is made to the address determined in step 1602, which may be local to a computing device executing workflow designer 106, or may be a remote computing device (e.g., a server, etc.), which may be communicated with over a network (e.g., the Internet).

In step 1606, the dynamic list is received. In response to the API call made by API caller 1112, list retriever 1104 receives the dynamic list. The dynamic list may have any form, including XML (extensible markup language), HTML (hypertext markup language), a file containing another type of code, a text file, etc.

Referring back to FIG. 15, in step 1504, the first input parameter value is enabled to be selected from the dynamic list by interacting with the first input control. In an embodiment, step configuration UI generator 310 displays the list retrieved in step 1502 in a pull down menu (or other UI element capable of displaying multiple selectable elements) when the developer invokes the pull down menu. The developer is then enabled to select the desired parameter value for the input parameter from the displayed list of parameter values.

For example, with respect to FIG. 14, an input control 1410 for workflow step 706 is a pulldown menu. In FIG. 14, a developer has invoked the pulldown menu (e.g., by clicking on the right-side inverted triangle) to be displayed a list of selectable parameter values. The list may have been retrieved in any manner according to step 1502, including by API caller 1112 according to flowchart 1600. The developer may select any of the displayed, selectable parameter values (e.g., "AzureRsrceMgrHlth", "Employees," "Enter custom value"). The selected parameter value becomes the parameter value for the input parameter associated with input control 1410.

Note that in one embodiment, the selection of a particular parameter value for an input parameter has no effect on other input parameters for a workflow step. In another embodiment, the input parameters for a workflow step may be dynamically modified based on a parameter value selection.

Figure 17:
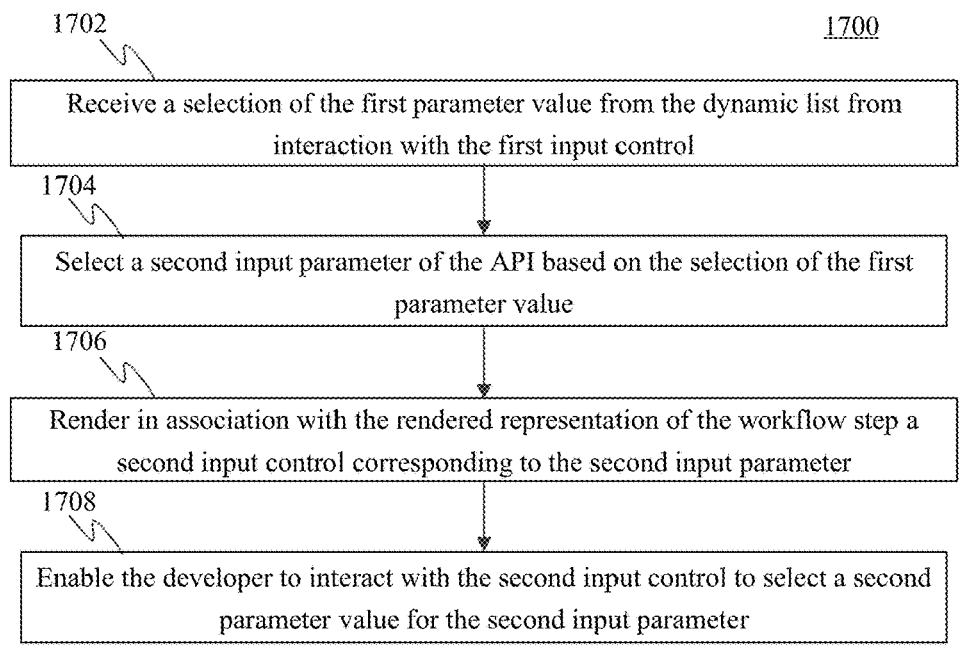
FIG. 17 shows a flowchart providing a process for dynamic modification of input parameters based on a selection of an input parameter, according to an example embodiment.

For instance, FIG. 17 shows a flowchart 1700 providing a process for dynamic modification of input parameters based on a selection of an input parameter, according to an example embodiment. In an embodiment, flowchart 1700 is performed by input parameter selector 1108 of FIG. 11. Flowchart 1700 and input parameter selector 1108 are described as follows.

Flowchart 1700 begins with step 1702. In step 1702, a selection is received of the first parameter value from the dynamic list from interaction with the first input control. For example, as described above with respect to step 1212 (FIG. 12), a developer is enabled to select a parameter value based on an interaction with an input control, including being able to select a parameter value from a dynamic list (e.g., as described above with respect to flowchart 1500 of FIG. 15).

In step 1704, a second input parameter of the API is selected based on the selection of the first parameter value. In an embodiment, input parameter selector 1108 receives the parameter value selection made in step 1702, and selects one or more additional input parameters for the workflow step based on the parameter value selection. For instance, in an embodiment, each parameter value listed in the dynamic list may be a table or other multi-parameter data entity. If the developer interacts with the input control in step 1702 to select a particular identified table as a parameter value, each column of the selected table may become an input parameter for the workflow step. Each table identified in the dynamic list may have its own corresponding collection of columns, different from the columns of other tables, which become input parameters for the workflow step, which would be different from the input parameters that would result from another table being selected.

In step 1706, a second input control corresponding to the second input parameter is rendered in association with the rendered representation of the workflow step. In an embodiment, step configuration UI generator 310 is configured to render in the workflow step the one or more additional input controls for the one or more additional input parameters selected in step 1704.

In step 1708, the developer is enabled to interact with the second input control to select a second parameter value for the second input parameter. Accordingly, after step configuration UI generator 310 renders one or more additional input controls for the workflow step in the workflow designer GUI corresponding to the additional input parameter(s) (determined in step 1704), the developer may interact with those additional input control(s) to select parameter values in the same manner as described above for other input controls (e.g., with respect to step 1212 of FIG. 12).

Figure 18:
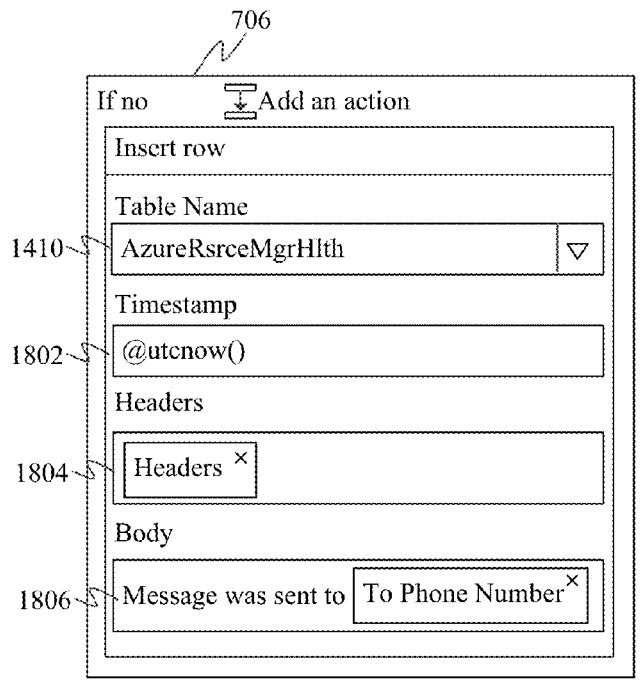
FIGS. 18 and 19 show block diagram views of a workflow development GUI where alternative sets of input parameters are respectively presented based on different selections of a workflow input parameter value, according to an example embodiment.
Figure 19:
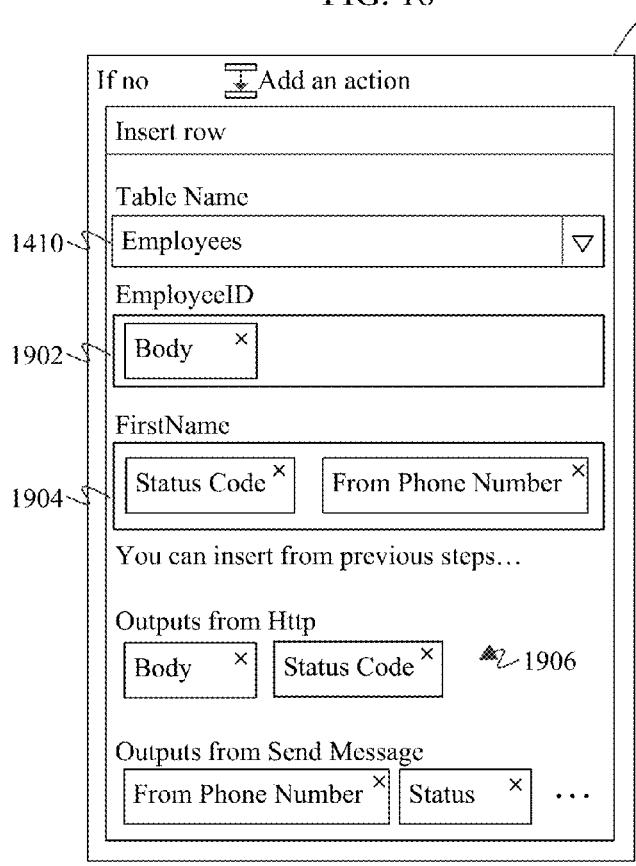

For illustrative purposes, FIGS. 18 and 19 show block diagram views of workflow development GUI 1300 where alternative sets of input parameters are respectively presented based on different selections of an input parameter in input control 1410 of FIG. 14, according to an example embodiment.

For instance, when a developer interacts with input control 1410 to select the parameter value of "AzureRsrceMgrHlth", additional input parameters 1802, 1804, and 1806 shown in FIG. 18 may be selected by input parameter selector 1108 and rendered in association with workflow step 706. Input parameters 1802, 1804, and 1806 may correspond to columns of a table identified by "AzureRsrceMgrHlth." When the developer interacts with input control 1410 to select the parameter value of "Employees", additional input parameters 1902 and 1904 shown in FIG. 19 may be selected by input parameter selector 1108 and rendered in association with workflow step 706. Input parameters 1902 and 1904 may correspond to columns of a table identified by "Employees." Any number of input parameters may result, depending on the number of columns in the corresponding table.

In the example of FIGS. 18 and 19, during runtime, an "insert row" operation is performed (upon the "no" condition for condition step 1306 of FIG. 14), which inserts the parameter values entered in either FIG. 18 or 19 (depending on which table was selected) into the corresponding table.

As shown in FIGS. 18 and 19, the developer may proceed with selecting input parameter values for each rendered input control. Such entry of input parameter values into input controls may be performed in various ways. As illustrated in FIG. 19, the developer may be enabled to select parameter values from a list of output parameter from prior workflow steps. For instance, workflow step 1304 of FIG. 3 labeled "Http" may generate output parameters labeled "Body" and "Status Code," and workflow step 706 labeled "Send Message" may generate output parameters labeled "From Phone Number," "Status," etc. The developer may be enabled to select these output parameters to have their parameter values as inputs to input controls for input parameters for workflow steps. For example, in FIG. 19, "Status Code" is selected as an input parameter to input control 1904 labeled "FirstName", and "Body" is selected as an input parameter to input control 1902 labeled "EmployeeID." In the examples of FIGS. 18 and 19, parameter values that are output values of prior workflow steps are rendered as blocks with identifying text inside to distinguish them from manually entered parameter values. Note that the blocks may be distinguished by any other graphical means, and may include further graphical features (e.g., color, font, etc.) to indicate various aspects, including being color coded to show which workflow step the parameter value is drawn from, etc.

Note that multiple output parameters may be selected as input to a single input control for a same input parameter. For example, as shown in FIG. 19, "Status Code" and "From Phone Number" are output parameters of "Hap" and "Send Message" workflow steps, respectively, and are both selected as inputs in input control 1904 for the input parameter labeled "FirstName" for workflow step 706. In such case, the runtime parameter values for the multiple selected output parameters input to the input control are concatenated to be a single input parameter value for the associated input parameter.

Additionally and/or alternatively text may be manually input to an input control in combination with one or more output parameters input to that same input control for an input parameter.

Note that in a further embodiment, the output parameters of a prior workflow step may be caused to automatically populate the corresponding input parameters of a subsequent workflow step. For instance, in an embodiment, control populator 1110 of FIG. 11 may be configured to automatically populate a second input control with a second input parameter value that is an output parameter value of a prior workflow step of the workflow. In an embodiment, control populator 1110 may analyze workflow step metadata in interface definition information, comparing output parameter names of workflow steps to input parameter names of subsequent workflow steps, and when a match is determined, may automatically populate the input controls for the matching input parameters with the output parameters of the prior workflow step(s).

For instance, with respect to FIG. 18, a prior workflow step may have output parameters of "Headers" and "To Phone Number", which match the input parameters associated with input controls 1804 and 1806. Accordingly, control populator 1110 may automatically populate input controls 1804 and 1806 with the corresponding matching output parameters.

It is noted that after selection (manual and/or automatic) of the parameter values, the developer may interact with workflow development GUI 1300 to save the selected parameter values for all workflow steps into workflow definition information 316 for the workflow being developed. In the same save operation, the interface definition information for all workflow steps may be saved into interface definition information 318 for the workflow being developed (e.g., as described above with respect to FIG. 3), if not already saved there.

D. Example Embodiments for Approval/Rejection of a Notification

According to embodiments, workflow designer 106 enables a workflow to be generated that includes a push notification to a user with an option to approve or deny. The associated workflow waits until the user responds, and may resume execution depending on the response by the user to the push notification. In an embodiment, the push notification is provided, and approval/rejection occurs, within a single app that implements the workflow.

In one illustrative example, a workflow may include a workflow step that monitors for the creation of a new document in a service, and generates an output indication of the new document creation. A push notification workflow step may be triggered by that output indication to issue a push notification to a user to approve or reject the document. The push notification may optionally include a link to the document that the user can click on to view the document. The user can interact with a control (e.g., a virtual button, etc.) of the push notification on their device to approve or reject the document. The push notification step waits for a response from the user before continuing. Once the user responds, the workflow may proceed to a conditional workflow step, which performs actions that depend on the response of the user (e.g., approve or reject) to the push notification, or the mere receipt of a response from the user may enable the workflow to continue on from the push notification workflow step.

Any kind and number of options may be provided to a user to respond to a push notification (e.g., indicate any one of approve, accept, deny, reject, etc.; provide the user's signature; provide an alphanumeric response, etc.)

The push notification may be provided to a workflow application (in a mobile computing device) that is associated with a workflow execution engine that executes the workflow, enabling mobile interactivity with an executing workflow, in an integrated manner.

Figure 20:
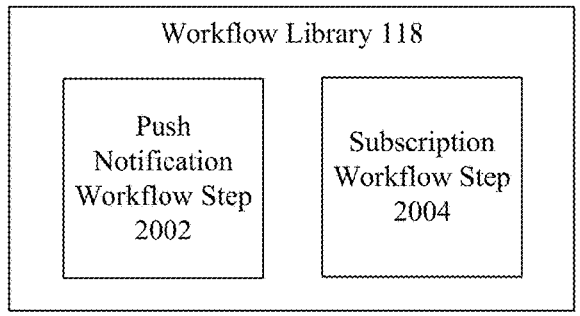
FIG. 20 shows a block diagram view of a push notification workflow step accessible in a workflow library, according to an example embodiment.

Embodiments for push notification may be implemented in various ways in embodiments. For instance, FIG. 20 shows a block diagram view of a push notification workflow step 2002 accessible in workflow library 118, according to an example embodiment. In embodiments, a developer developing a workflow may select push notification workflow step 2002 from workflow library 118 for inclusion in a workflow as described elsewhere herein (e.g., as described with respect to step 204 of FIG. 2). Push notification workflow step 2002 includes logic (e.g., with input and output parameters values defined by workflow definition information and an API defined by interface definition information in the form of two files, or other form) that executes a push notification to a defined user and waits for a response from the user to the push notification.

Figure 21:
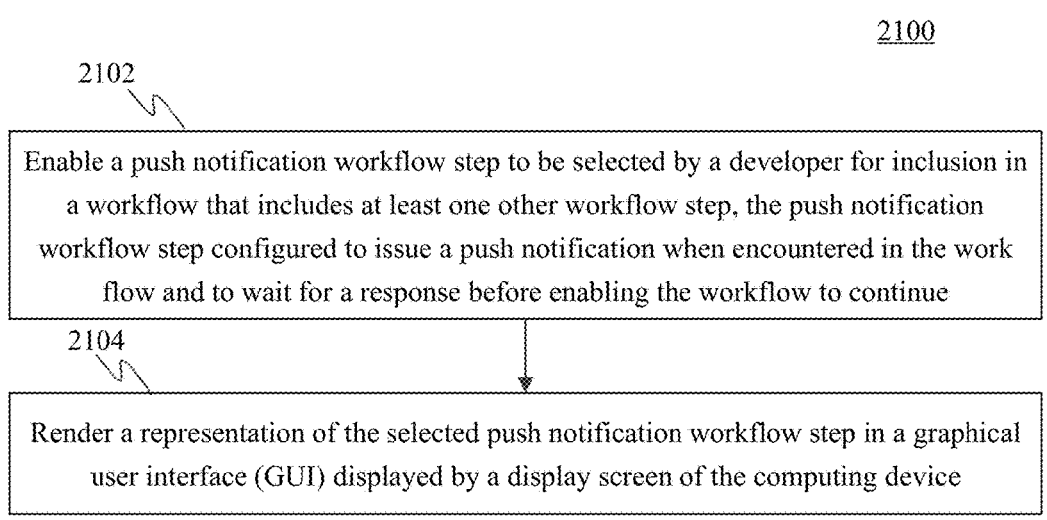
FIG. 21 shows a flowchart providing a process for incorporating a push notification workflow step into a workflow, according to an example embodiment.

For instance, in an embodiment, push notification workflow step 2002 may be integrated into a workflow according to FIG. 21. FIG. 21 shows a flowchart 2100 providing a process for incorporating a push notification workflow step into a workflow, according to an example embodiment. Flowchart 2100 is described as follows.

In step 2102, a push notification workflow step is enabled to be selected by a developer for inclusion in a workflow that includes at least one other workflow step, the push notification workflow step configured to issue a push notification when encountered in the work flow and to wait for a response before enabling the workflow to continue. For example, step selector 308 of FIG. 3 may be configured to enable a push notification workflow step 2002 to be selected by a developer for inclusion in a workflow that includes at least one other workflow step. As described herein, push notification workflow step 2002 is configured to issue a push notification when encountered in the workflow and to wait for a response before enabling the workflow to continue.

Note alternatively, push notification workflow step 2002 may be included in a template selectable in a template gallery generated using template gallery generator 304, may be selectable from a workflow step gallery generated using workflow step gallery generator 302, or may be selected in another manner for inclusion in a workflow.

In step 2104, a representation of the selected push notification workflow step is rendered in a graphical user interface (GUI) displayed by a display screen of the computing device. Step selector 308 is configured to render a representation of push notification workflow step 2002 in a graphical user interface (GUI) displayed by a display screen of the computing device, such as workflow designer GUI 116 displayed in display screen 108 in FIG. 3. In an embodiment, step configuration UI generator 310 is configured to enable configuration of the selected push notification to define at least one recipient (to receive the push notification) and at least one response option for the at least one recipient, and to enable the configured push notification to be saved to workflow logic.

Figure 22:
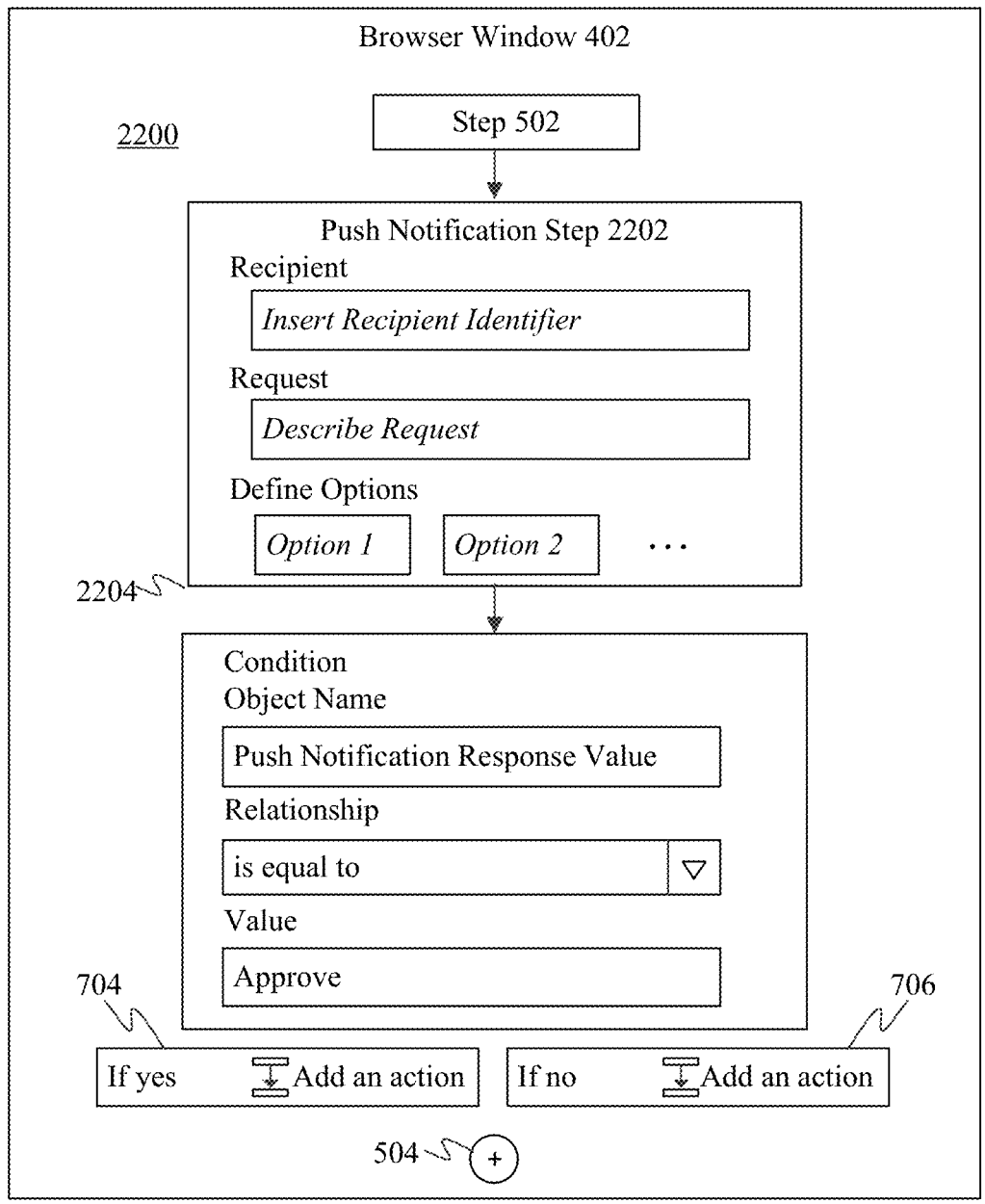
FIG. 22 shows a block diagram view of a workflow development GUI where a push notification action is integrated into a workflow, according to an example embodiment.

For example, FIG. 22 shows a block diagram view of a workflow development GUI 2200 where a push notification action is integrated into a workflow, according to an example embodiment. As shown in FIG. 22, a workflow step 502 is followed in a workflow by a push notification workflow step 2202 selected by a developer. The developer configures push notification workflow step 2202. For instance, the developer may indicate a recipient for the push notification (e.g., by email address, phone number, or other suitable identifier), may describe the request (e.g., "Please approve the attached document", "please provide your signature," etc.), and the description may attach or optionally include a link to a document or other item for the recipient to view, and may define one or more options for the recipient's selection. For instance, the developer may interact with step configuration UI generator 310 to define one or more controls (e.g., push buttons, check boxes, radio buttons, pull-down menus, etc.) that indicate respective selections (e.g., "approve," "deny", "fill in P.O. number," etc.).

Furthermore, as shown in FIG. 22, the developer may include a condition workflow step 2204 in the workflow following the push notification workflow step 2202 that performs one or more actions based on a response to the push notification received from a user (e.g., "email document," "delete document," "generate invoice," etc.).

Figure 23:
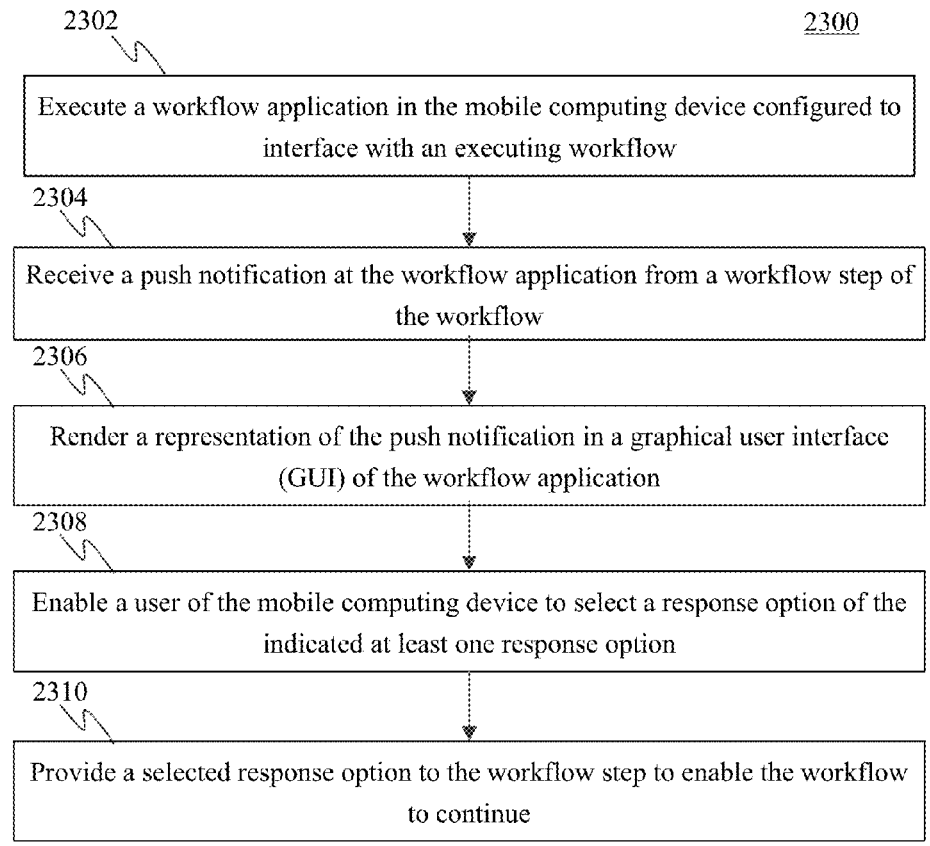
FIG. 23 shows a flowchart providing a process for operating a push notification workflow step in a workflow, according to an example embodiment.
Figure 24:
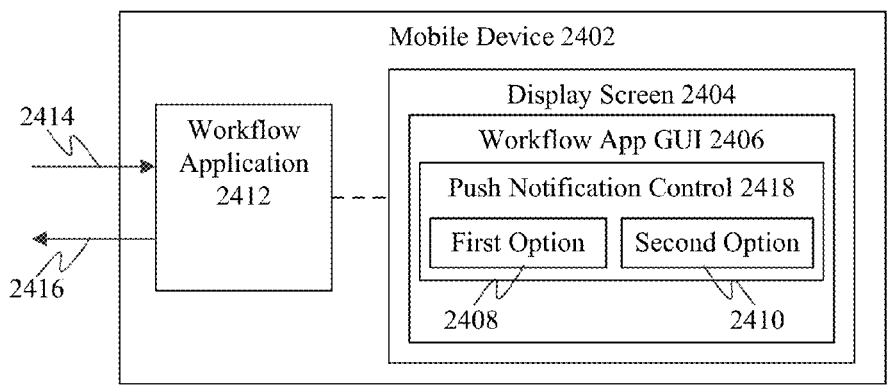
FIG. 24 shows a block diagram view of a mobile device displaying a GUI for a workflow application displaying a push notification, according to an example embodiment.

In embodiments, push notification functionality may operate in workflows in various ways. For instance, FIG. 23 shows a flowchart 2300 providing a process for operating a push notification workflow step in a workflow, according to an example embodiment. Flowchart 2300 is described as follows with respect to FIG. 24. FIG. 24 shows a block diagram view of a mobile device 2402 executing a workflow application 2412 configured to enable push notification, according to an example embodiment.

Flowchart 2300 begins with step 2302. In step 2302, a workflow application is executed in the mobile computing device that is configured to interface with an executing workflow. For example, as shown in FIG. 24, workflow application 2412 executes in mobile device 2402. Workflow application 2412 is an example of workflow application 904 of FIG. 9. In one embodiment, workflow application 2412 may be a client/local application component of a client-server application that operates workflows. A server-side component of the client-server application may execute in one or more servers and communicate with workflow application 2412 over a network (e.g., network 126 of FIG. 9). In another embodiment, workflow application 2412 may operate entirely in mobile device 2402. Workflow application 2412 may generate a user interface in the form of workflow app GUI 2406 to enable user interaction with workflow application 2412 at mobile device 2402. Workflow application 2412 may be browser-based or execute independent of a browser in mobile device 2402.

In step 2304, a push notification is received at the workflow application from a workflow step of the workflow. As shown in FIG. 24, in a client-server implementation, workflow application 2412 may receive a push notification 2414 from the server component of the application that runs an associated workflow. In another embodiment, workflow application 2412 operates the workflow itself and generates the push notification internally. The push notification is received/generated because a push notification workflow step (e.g., step 2002 of FIG. 20) has been reached in the workflow. The push notification workflow step generates and transmits push notification 2414 to elicit a response from the user of mobile device 2402.

In step 2306, a representation of the push notification is rendered in a graphical user interface (GUI) of the workflow application. As shown FIG. 24, workflow application 2412 may cause a representation of the push notification to be displayed in workflow app GUI 2406, such as in the form of a push notification control 2418. Push notification control 2418 may have any form to display information to the user, including text, images, video, etc., and may display one or more control elements for interaction by the user, such as buttons, text boxes, check boxes, menus, etc. In the example of FIG. 24, push notification control 2418 includes first and second options 2408 and 2410, displayed as buttons. Push notification control 2418 may be configured to be displayed on display screen 2404 when mobile device 2402 is locked, unlocked, and/or in any other configuration as desired.

In step 2308, a user of the mobile computing device is enabled to select a response option of the indicated at least one response option. In an embodiment, the user of mobile device 2402 may interact with notification control 2418 to select a response option for push notification 2414. For example, the user may press a displayed button, check a displayed box, select a menu option, etc. to provide their response indication. In the example of FIG. 24, the user may select one of first option 2408 or second option 2410.

Note that push notification control 2418 may also provide links to one or more documents, web pages, or other objects for the user to review prior to making their selection. The user may click the link(s), review any necessary materials, and then make their selection by interacting with the displayed response controls.

In step 2310, a selected response option is provided to the workflow step to enable the workflow to continue. As shown in FIG. 24, workflow application 2412 receives the response option selected by the user at workflow app GUI 2406. Workflow application 2412 may optionally process the response option, then as shown in FIG. 24, in a client/server implementation, may transmit the selected response option 2416 to the server. In another embodiment, workflow application 2412 executes the logic of the workflow internally, and thus does not transmit selected response option 2416 from mobile device 2402, but instead uses selected response option 2416 itself. The workflow operating at the server or internal to workflow application 2412 in mobile device 2402 receives selected response option 2416, which enables the workflow to continue operation. A conditional workflow step of the workflow may select an operation path (e.g., branches or forks) based on the contents/value of selected response option 2416.

E. Example Embodiments for Nested Workflows

Embodiments enable workflows to be generated and saved as discrete workflow steps, which can in turn be selected and placed in further workflows under development. In this manner, workflows may be nested inside of each other to build workflows with greater complexity.

For example, a workflow can be generated by a developer as described above, by inserting and interconnecting workflow steps in the workflow, and saving the workflow. In an embodiment, a saved workflow may be saved to workflow library 118 or another location (e.g., a personal folder of the developer) as workflow logic 120, which may include workflow definition information 316 and interface definition information 318 as a pair of files (or other form) to define the workflow in a similar manner as a workflow step. If other developers can access the storage location, the workflow can be "shared" with them. The other developers may be enabled to select the workflow in the same manner as a workflow step from workflow library 118, for inclusion in another workflow under development.

In one embodiment, a workflow may be saved in this manner without having input parameter values selected. In such case, being more generic, the workflow may be saved as a form of "template," such as the templates made accessible by template gallery generator 304. In another embodiment, a workflow may be saved with input parameter values selected (e.g., as described above with respect to flowchart 1200 of FIG. 12). In such case, it may be desirable for the workflow to be saved to a less publically accessible folder, such a folder personal/private to the developer. This is because the input parameter values saved with the workflow may include information specific to the developer, potentially including personal information, which may not be desirable to disseminate to others. Because the workflow is saved with input parameter values, the workflow is accessible as a complete workflow for insertion into other workflows in the same manner as a workflow step.

Note that access to the workflow in workflow library 118 or elsewhere may be restricted based on a registered privilege level assigned to the workflow, including personal, private, corporate, world access, etc. Workflows having a higher privilege level than that of a developer may not be displayed to the developer (may be hidden) when the developer peruses workflow library 118 (or other folder).

Figure 25:
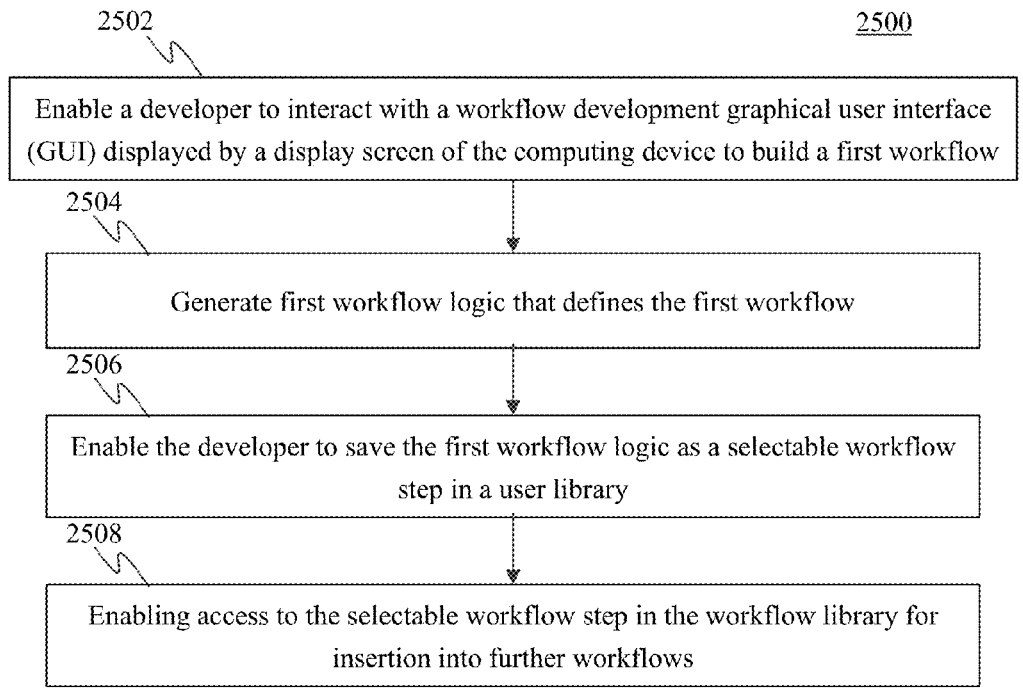
FIG. 25 shows a flowchart providing a process for reusing workflows as workflow steps, according to an example embodiment.

Accordingly, in embodiments, a workflow may be generated and incorporated in other workflows in various ways. For instance, FIG. 25 shows a flowchart 2500 providing a process for reusing workflows as workflow steps, according to an example embodiment. Flowchart 2500 is described as follows.

Flowchart 2500 begins with step 2502. In step 2502, a developer is enabled to interact with a workflow development graphical user interface (GUI) displayed by a display screen of the computing device to build a first workflow. Embodiments are described in detail above for enabling developers to generate workflows by interacting with workflow designer GUI 116 (of workflow designer 106), at least with reference to FIGS. 1-8.

In step 2504, first workflow logic is generated that defines the first workflow. In one example, as described above, workflow logic generator 112 generates workflow logic 120, which is logic defining a built workflow.

In step 2506, the developer is enabled to save the first workflow logic as a selectable workflow step in a user library. As described above, workflow logic generator 112 (FIGS. 1 and 3) is configured to package and generate workflow logic 120 based on constructed workflow information 138, which the developer can save as a workflow.

Figure 26:
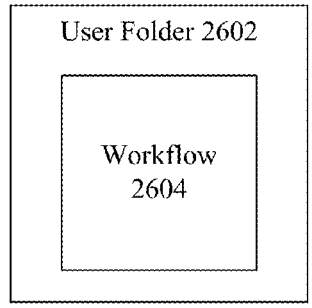
FIG. 26 shows a block diagram view of a workflow accessible as a workflow step in a user folder, according to an example embodiment.

FIG. 26 shows a block diagram view of a workflow 2604 that has been saved in a user folder 2602, which may be a personal library for the developer, according to an example embodiment. Workflow 2604 contains workflow logic (e.g., workflow logic 120), and includes input parameter values (e.g., selected according to flowchart 1200 of FIG. 12 or in another manner). In this manner, workflow 2604 is not a generic workflow template, but instead is a fully-configured operational workflow.

Figure 27:
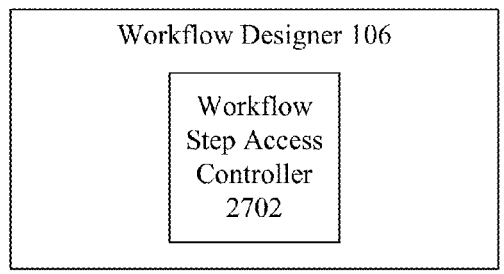
FIG. 27 shows a block diagram of a workflow designer that contains a workflow step access controller, according to an example embodiment.

In step 2508, access is enabled to the selectable workflow step in the user library for insertion into further workflows. As shown in FIG. 27, workflow designer 106 may include a workflow step access controller 2702. Workflow step access controller 2702 is configured to enable access to workflow 2604 in user folder 2602, in a similar manner to the way workflow steps can be selected from a workflow library. In particular, workflow step access controller 2702 enables a developer to select and insert workflow 2604 into further workflows in a similar manner as a workflow step is selected from workflow library 118 (FIG. 1) (e.g., by step selector 308 of FIG. 3).

Note that in an embodiment, workflow designer 106 may assign a privilege level to workflow 2604. The privilege may be assigned automatically (e.g., based on the folder in which the workflow is stored) or manually by a developer interacting with workflow designer GUI 116. In this manner, workflow step access controller 2702 may restrict subsequent attempts to access workflow 2604 in user folder 2602 based on the assigned privilege level.

F. Example Embodiments for Extended Workflows to Link End-to-End

In embodiments, a second workflow may subscribe to a first workflow, thereby enabling the output of the first workflow to flow into the second workflow. By subscribing, there is no need for a message bus or service bus to link the workflows. The first workflow is isolated from the second workflow. However, the second workflow references and is coupled to the first workflow by this reference. The second workflow may be inactive until the first workflow is complete, be notified of its completion due to the first workflow publishing its outputs/results (e.g., to a log file, to a publication document, etc.), and upon receiving this notification, the second workflow may execute its functions in otherwise complete independence from the first workflow. The second workflow may optionally receive the output data of the first workflow as input data to its own workflow steps.

Figure 28:
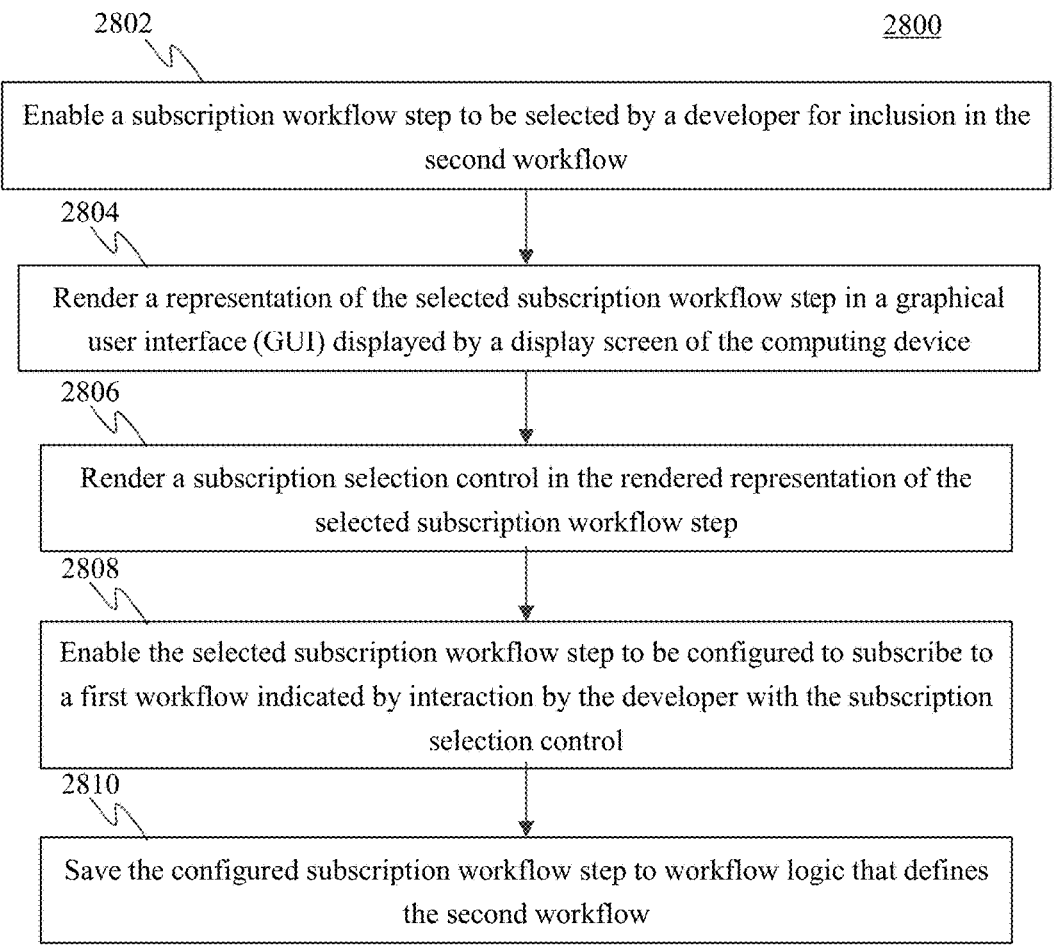
FIG. 28 shows a flowchart providing a process for enabling a workflow to subscribe to another workflow, according to an example embodiment.

Subscription by a second workflow to a first workflow may be performed in various ways. For instance, FIG. 28 shows a flowchart 2800 providing a process for enabling a workflow to subscribe to another workflow, according to an example embodiment. Flowchart 2800 is described as follows.

Flowchart 2800 begins with step 2802. In step 2802, a subscription workflow step is enabled to be selected by a developer for inclusion in the second workflow. FIG. 20 shows a block diagram view of an example subscription workflow step 2004 accessible in workflow library 118. In embodiments, a developer developing a workflow may select subscription workflow step 2004 from workflow library 118 for inclusion in a workflow as described elsewhere herein (e.g., as described with respect to step 204 of FIG. 2). Subscription workflow step 2004 is configurable by a developer to monitor for the completion of a designated first workflow, and upon detecting the completion, to enable a second workflow in which subscription workflow step 2004 is included to begin execution. In an embodiment, subscription workflow step 2004 may receive one or more outputs of the first workflow, and may enable the second workflow to begin execution based on one or more conditions being fulfilled by the outputs of the first workflow.

Step selector 308 of FIG. 3 may be configured to enable subscription workflow step 2004 to be selected by a developer for inclusion in a workflow that includes at least one other workflow step. Alternatively, subscription workflow step 2004 may be included in a template that is selectable in a template gallery generated using template gallery generator 304, may be selectable from a workflow step gallery generated using workflow step gallery generator 302, or may be selected in another manner for inclusion in a workflow.

Referring back to FIG. 28, in step 2804, a representation of the selected subscription workflow step is rendered in a graphical user interface (GUI) displayed by a display screen of the computing device. Step selector 308 (or other selector type) is configured to render a representation of subscription workflow step 2004 in a graphical user interface (GUI) displayed by a display screen of the computing device, such as workflow designer GUI 116 displayed in display screen 108 in FIG. 3.

Figure 29:
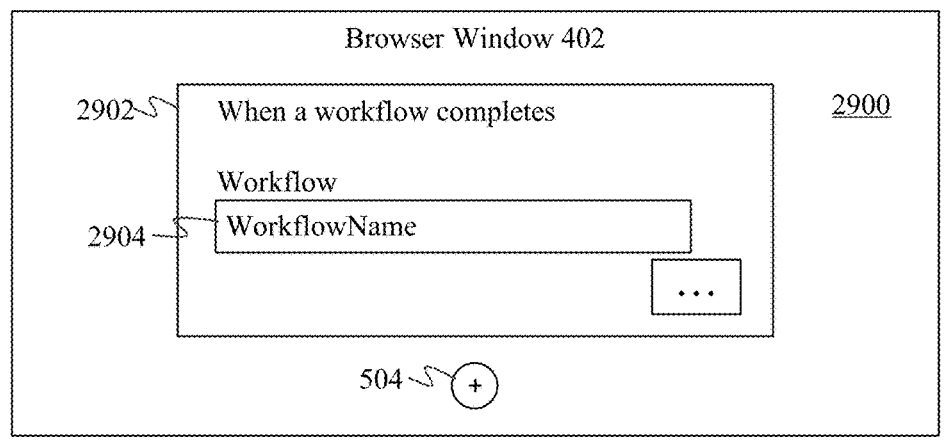
FIG. 29 shows a block diagram view of a workflow development GUI where a workflow subscription step is integrated into a workflow, according to an example embodiment.

For example, FIG. 29 shows a block diagram view of a workflow development GUI 2900 where a workflow subscription step 2902 is integrated into a workflow, according to an example embodiment. In FIG. 29, the developer has selected (e.g., from workflow library 118) and placed workflow subscription step 2902 in GUI 2800, and has interacted with workflow subscription step 2902 (e.g., by mouse click, etc.) to cause step configuration UI generator 310 to generate a UI for configuration workflow subscription step 2902. Workflow subscription step 2902 is configured to monitor for a workflow to complete, such as by monitoring output data or receiving a signal when the workflow completes, such as an indication stored in a log file, etc.

In step 2806, a subscription selection control is rendered in the rendered representation of the selected subscription workflow step. In an embodiment, as described above, step configuration UI generator 310 is configured to render, in association with the rendered representation of subscription workflow step 2004 selected in step 2802, a subscription selection control that enables a subscription selection input parameter value to be provided. Any suitable control type may be used (e.g., a text box, a file navigator, a pull down menu, etc.), which may be indicated in the interface definition information associated with subscription workflow step 2004.

For instance, as shown in FIG. 29, a subscription selection control 2904 is rendered in subscription workflow step 2902. In this example, control 2904 is shown as a navigator, but in other embodiments, may be another control type.

In step 2808, the selected subscription workflow step is enabled to be configured to subscribe to a first workflow indicated by interaction by the developer with the subscription selection control. For instance, as shown in FIG. 29, a developer is enabled to indicate the workflow-to-be-monitored in subscription selection control 2904 such as by typing, by clicking on a navigator control (e.g., indicated by " . . . "), or in another manner. Furthermore, as described more fully elsewhere herein, input parameters of the workflow containing subscription workflow step 2004 may be configured to receive output parameter values of the subscribed-to workflow as input parameter values.

In step 2810, the configured subscription workflow step is saved to workflow logic that defines the second workflow. As described above, workflow logic generator 112 (FIGS. 1 and 3) is configured to package and generate workflow logic 120 based on constructed workflow information 138, which the developer can save as a workflow. The workflow can be executed to perform its functions.

Accordingly, when the workflow designed in accordance with FIG. 29 is executed (at runtime), workflow subscription step 2902 monitors for the completion of the workflow subscribed to (in step 2808). When workflow subscription step 2902 determines the subscribed-to workflow has completed, the workflow of FIG. 29 receives output data of the subscribed-to workflow (e.g., from a log file, etc.), and a workflow step following workflow subscription step 2902 (not shown in FIG. 29) is triggered. Thus, workflow subscription step 2902 may be considered a trigger step in this example. The outputs of the subscribed-to workflow may be input parameter values for the designed workflow.

III. Example Mobile and Stationary Device Embodiments

Computing device 102, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, metadata analyzer 1102, list retriever 1104, input parameter selector 1108, control populator 1110, API caller 1112, mobile device 2402, workflow application 2412, workflow step access controller 2702, flowchart 200, flowchart 1000, flowchart 1200, flowchart 1500, flowchart 1600, flowchart 1700, flowchart 2100, flowchart 2300, flowchart 2500, and flowchart 2800 may be implemented in hardware, or hardware combined with software and/or firmware. For example, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, metadata analyzer 1102, list retriever 1104, input parameter selector 1108, control populator 1110, API caller 1112, workflow application 2412, workflow step access controller 2702, flowchart 200, flowchart 1000, flowchart 1200, flowchart 1500, flowchart 1600, flowchart 1700, flowchart 2100, flowchart 2300, flowchart 2500, and/or flowchart 2800 may be implemented as computer program code/instructions configured to be executed in one or more processors and stored in a computer readable storage medium. Alternatively, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, metadata analyzer 1102, list retriever 1104, input parameter selector 1108, control populator 1110, API caller 1112, workflow application 2412, workflow step access controller 2702, flowchart 200, flowchart 1000, flowchart 1200, flowchart 1500, flowchart 1600, flowchart 1700, flowchart 2100, flowchart 2300, flowchart 2500, and/or flowchart 2800 may be implemented as hardware logic/electrical circuitry.

For instance, in an embodiment, one or more, in any combination, of workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, metadata analyzer 1102, list retriever 1104, input parameter selector 1108, control populator 1110, API caller 1112, workflow application 2412, workflow step access controller 2702, flowchart 200, flowchart 1000, flowchart 1200, flowchart 1500, flowchart 1600, flowchart 1700, flowchart 2100, flowchart 2300, flowchart 2500, and/or flowchart 2800 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 30:
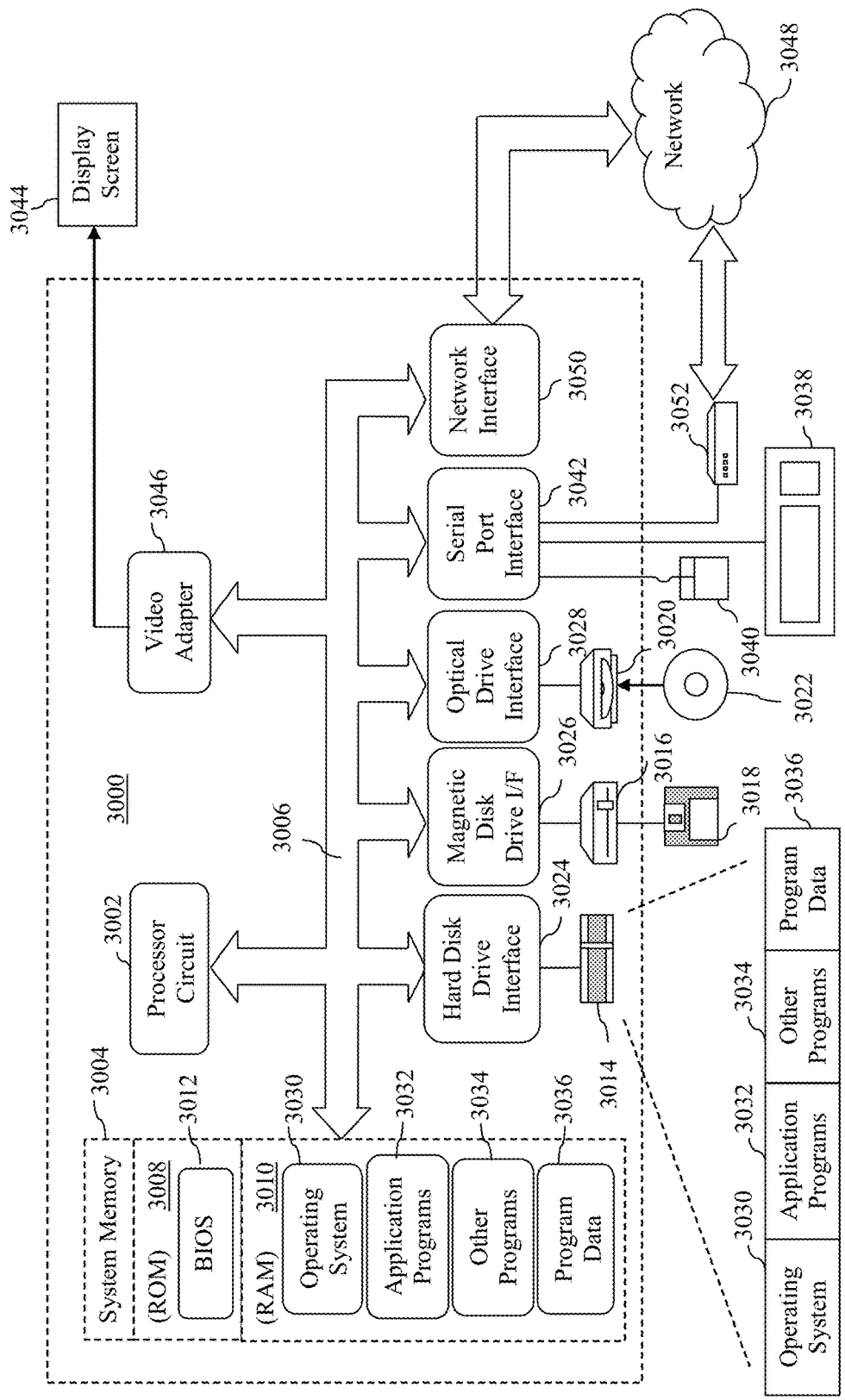
FIG. 30 shows a block diagram of an example computing device that may be used to implement embodiments.

FIG. 30 depicts an exemplary implementation of a computing device 3000 in which embodiments may be implemented. For example, any of computing device 102, server 134, and mobile device 2402 may be implemented in one or more computing devices similar to computing device 3000 in stationary or mobile computer embodiments, including one or more features of computing device 3000 and/or alternative features. The description of computing device 3000 provided herein is provided for purposes of illustration, and is not intended to be limiting. Embodiments may be implemented in further types of computer systems, as would be known to persons skilled in the relevant art(s).

As shown in FIG. 30, computing device 3000 includes one or more processors, referred to as processor circuit 3002, a system memory 3004, and a bus 3006 that couples various system components including system memory 3004 to processor circuit 3002. Processor circuit 3002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 3002 may execute program code stored in a computer readable medium, such as program code of operating system 3030, application programs 3032, other programs 3034, etc. Bus 3006 represents one or more of any of several types of bus structures, including a memory bus or memory controller, a peripheral bus, an accelerated graphics port, and a processor or local bus using any of a variety of bus architectures. System memory 3004 includes read only memory (ROM) 3008 and random access memory (RAM) 3010. A basic input/output system 3012 (BIOS) is stored in ROM 3008.

Computing device 3000 also has one or more of the following drives: a hard disk drive 3014 for reading from and writing to a hard disk, a magnetic disk drive 3016 for reading from or writing to a removable magnetic disk 3018, and an optical disk drive 3020 for reading from or writing to a removable optical disk 3022 such as a CD ROM, DVD ROM, or other optical media. Hard disk drive 3014, magnetic disk drive 3016, and optical disk drive 3020 are connected to bus 3006 by a hard disk drive interface 3024, a magnetic disk drive interface 3026, and an optical drive interface 3028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 3030, one or more application programs 3032, other programs 3034, and program data 3036. Application programs 3032 or other programs 3034 may include, for example, computer program logic (e.g., computer program code or instructions) for implementing workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, metadata analyzer 1102, list retriever 1104, input parameter selector 1108, control populator 1110, API caller 1112, workflow application 2412, workflow step access controller 2702, flowchart 200, flowchart 1000, flowchart 1200, flowchart 1500, flowchart 3000, flowchart 1700, flowchart 2100, flowchart 2300, flowchart 2500, and/or flowchart 2800 (including any suitable step of flowcharts 200, 1000, 1200, 1500, 1600, 1700, 2100, 2300, 2500, 2800), and/or further embodiments described herein.

A user may enter commands and information into the computing device 3000 through input devices such as keyboard 3038 and pointing device 3040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 3002 through a serial port interface 3042 that is coupled to bus 3006, but may be connected by other interfaces, such as a parallel port, game port, or a universal serial bus (USB).

A display screen 3044 is also connected to bus 3006 via an interface, such as a video adapter 3046. Display screen 3044 may be external to, or incorporated in computing device 3000. Display screen 3044 may display information, as well as being a user interface for receiving user commands and/or other information (e.g., by touch, finger gestures, virtual keyboard, etc.). In addition to display screen 3044, computing device 3000 may include other peripheral output devices (not shown) such as speakers and printers.

Computing device 3000 is connected to a network 3048 (e.g., the Internet) through an adaptor or network interface 3050, a modem 3052, or other means for establishing communications over the network. Modem 3052, which may be internal or external, may be connected to bus 3006 via serial port interface 3042, as shown in FIG. 30, or may be connected to bus 3006 using another interface type, including a parallel interface.

As used herein, the terms "computer program medium," "computer-readable medium," and "computer-readable storage medium" are used to refer to physical hardware media such as the hard disk associated with hard disk drive 3014, removable magnetic disk 3018, removable optical disk 3022, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 3032 and other programs 3034) may be stored on the hard disk, magnetic disk, optical disk, ROM, RAM, or other hardware storage medium. Such computer programs may also be received via network interface 3050, serial port interface 3042, or any other interface type. Such computer programs, when executed or loaded by an application, enable computing device 3000 to implement features of embodiments discussed herein. Accordingly, such computer programs represent controllers of the computing device 3000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In a first embodiment, a method in a computing device for visualizing API (application programming interface) metadata in a workflow designer comprises: enabling a workflow step to be selected by a developer for inclusion in a workflow; rendering a representation of the selected workflow step in a graphical user interface (GUI) displayed by a display screen of the computing device; accessing interface definition information for metadata defining an API associated with the workflow step; analyzing the metadata for a first input parameter of the API; rendering in association with the rendered representation of the workflow step a first input control corresponding to the first input parameter; and enabling the developer to interact with the first input control to select a first parameter value for the first input parameter, wherein the first selected parameter value is provided to and affects operation of at least one of an application or service associated with the workflow step during operation of the workflow.

In an embodiment, the enabling the developer to interact with the first input control to select a first parameter value for the first input parameter comprises: retrieving a dynamic list of selectable values for the first input parameter value; and enabling the first input parameter value to be selected from the dynamic list by interacting with the first input control.

In an embodiment, the retrieving a dynamic list of selectable values for the first parameter value comprises: analyzing the metadata to determine an address to direct an API call to retrieve the dynamic list; performing the API call; and receiving the dynamic list.

In an embodiment, the method further comprises: receiving a selection of the first parameter value from the dynamic list from interaction with the first input control; selecting a second input parameter of the API based on the selection of the first parameter value; rendering in association with the rendered representation of the workflow step a second input control corresponding to the second input parameter; and enabling the developer to interact with the second input control to select a second parameter value for the second input parameter.

In an embodiment, the method further comprises: enabling the developer to interact with the second input control to select a second parameter value for the first input parameter such that multiple parameter values are selected for the first input parameter.

In an embodiment, the enabling the developer to interact with the first input control to select a first parameter value for the first input parameter comprises: enabling the developer to select the first parameter value from an output of a prior workflow step.

In an embodiment, the method further comprises: rendering in association with the rendered representation of the workflow step a second input control corresponding to a second input parameter; and automatically populating the second input control with a second input parameter value that is an output parameter value of a prior workflow step of the workflow.

In another embodiment, a system comprises: at least one processor circuit; and at least one memory that stores program code configured to be executed by the at least one processor circuit, the program code comprising: a step selector configured to enable a workflow step to be selected by a developer for inclusion in a workflow, and to render a representation of the selected workflow step in a graphical user interface (GUI) displayed by a display screen; a metadata analyzer configured to access interface definition information for metadata defining an API associated with the workflow step, and to analyze the metadata for a first input parameter of the API; and a step configuration UI generator configured to render in association with the rendered representation of the workflow step a first input control corresponding to the first input parameter, and to enable the developer to interact with the first input control to select a first parameter value for the first input parameter.

In an embodiment, the system further comprises: a list retriever configured to retrieve a dynamic list of selectable values for the first input parameter value; and the step configuration UI generator is configured to enable the first input parameter value to be selected from the dynamic list by interaction with the first input control.

In an embodiment, the list retriever comprises: an API caller configured to analyze the metadata to determine an address to direct an API call to retrieve the dynamic list, perform the API call, and receive the dynamic list.

In an embodiment, the control interface is configured to receive a selection of the first parameter value from the dynamic list from interaction with the first input control; the system further including: an input parameter selector configured to select a second input parameter of the API based on the selection of the first parameter value; and the step configuration UI generator is configured to render in association with the rendered representation of the workflow step a second input control corresponding to the second input parameter and enable the developer to interact with the second input control to select a second parameter value for the second input parameter.

In an embodiment, the step configuration UI generator is configured to enable the developer to interact with the second input control to select a second parameter value for the first input parameter such that multiple parameter values are selected for the first input parameter.

In an embodiment, the step configuration UI generator is configured to enable the developer to select the first parameter value from an output of a prior workflow step.

In an embodiment, the system further comprises: a control populator configured to automatically populate the second input control with a second input parameter value that is an output parameter value of a prior workflow step of the workflow.

In another embodiment, a method in a computing device for developing a workflow to include push notification functionality comprises: enabling a push notification workflow step to be selected by a developer for inclusion in a workflow that includes at least one other workflow step, the push notification workflow step configured to issue a push notification when encountered in the work flow and to wait for a response before enabling the workflow to continue; and rendering a representation of the selected push notification workflow step in a graphical user interface (GUI) displayed by a display screen of the computing device.

In an embodiment, the method further comprises: enabling a developer to define at least one recipient and at least one response option for the at least one recipient for the selected push notification workflow step; and saving the configured push notification to workflow logic that defines the workflow.

In another embodiment, a system for developing a workflow to include push notification functionality comprises: at least one processor circuit; and at least one memory that stores program code configured to be executed by the at least one processor circuit, the program code comprising: a step selector configured to enable a push notification workflow step to be selected by a developer for inclusion in a workflow that includes at least one other workflow step, the push notification workflow step configured to issue a push notification when encountered in the work flow and to wait for a response before enabling the workflow to continue, and to render a representation of the selected push notification workflow step in a graphical user interface (GUI) displayed by a display screen of the computing device; and a step configuration UI generator configured to enable configuration of the selected push notification to define at least one recipient and at least one response option for the at least one recipient, and to enable the configured push notification to be saved to workflow logic that defines the workflow.

In an embodiment, the step configuration UI generator is configured to enable a developer to define at least one recipient and at least one response option for the at least one recipient for the selected push notification workflow step, and to save the configured push notification to workflow logic that defines the workflow.

In another embodiment, a method in a computing device for developing a second workflow to subscribe to a first workflow comprises: enabling a subscription workflow step to be selected by a developer for inclusion in the second workflow, the subscription workflow step configured to wait for output information from a selectable subscribed-to workflow before enabling the second workflow to continue; rendering a representation of the selected subscription workflow step in a graphical user interface (GUI) displayed by a display screen of the computing device; rendering a subscription selection control in the rendered representation of the selected subscription workflow step; enabling the selected subscription workflow step to be configured to subscribe to a first workflow indicated by interaction by the developer with the subscription selection control; and saving the configured subscription workflow step to workflow logic that defines the second workflow.

In another embodiment, a system in a computing device for developing a second workflow to subscribe to a first workflow, comprises: at least one processor circuit; and at least one memory that stores program code configured to be executed by the at least one processor circuit, the program code comprising: a step selector configured to enable a subscription workflow step to be selected by a developer for inclusion in the second workflow, the subscription workflow step configured to wait for output information from a selectable subscribed-to workflow before enabling the second workflow to continue, and to render a representation of the selected subscription workflow step in a graphical user interface (GUI) displayed by a display screen of the computing device; and a step configuration UI generator configured to render a subscription selection control in the rendered representation of the selected subscription workflow step, to enable the selected subscription workflow step to be configured to subscribe to a first workflow indicated by interaction by the developer with the subscription selection control, and to enable the configured subscription workflow step to be saved to workflow logic that defines the second workflow.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device for visualizing API (application programming interface) metadata in a workflow designer, comprising:
enabling a workflow step to be selected by a developer for inclusion in a workflow;
rendering a representation of the selected workflow step in a graphical user interface (GUI) displayed by a display screen of the computing device;
accessing interface definition information to obtain metadata defining an API associated with the workflow step;
analyzing the metadata to determine a first input parameter of the API;
rendering in the GUI including the rendered representation of the workflow step a first input control corresponding to the first input parameter, the first input control and rendered representation of the workflow step being simultaneously visible in the GUI;
retrieving a dynamic list of selectable values for a first parameter value for the first input parameter; and
enabling the first parameter value to be selected from the dynamic list by interacting with the first input control, wherein the first parameter value selected from the dynamic list is provided to and affects operation of at least one of an application or service associated with the workflow step during operation of the workflow.

2. The method of claim 1, wherein said retrieving a dynamic list of selectable values for the first parameter value comprises:
analyzing the metadata to determine an address to direct an API call to retrieve the dynamic list;
performing the API call; and
receiving the dynamic list.

3. The method of claim 2, further comprising:
receiving a selection of the first parameter value from the dynamic list from interaction with the first input control;
selecting a second input parameter of the API based on the selection of the first parameter value;
rendering in the GUI including the rendered representation of the workflow step a second input control corresponding to the second input parameter; and
enabling the developer to interact with the second input control to select a second parameter value for the second input parameter.

4. The method of claim 3, further comprising:
enabling the developer to interact with the second input control to select a third parameter value for the first input parameter such that multiple parameter values are selected for the first input parameter.

5. The method of claim 1, further comprising:
enabling the developer to select the first parameter value from an output of a prior workflow step.

6. The method of claim 1, further comprising:
rendering in association with the rendered representation of the workflow step a second input control corresponding to a second input parameter; and
automatically populating the second input control with a second input parameter value that is an output parameter value of a prior workflow step of the workflow.

7. The method of claim 1 further comprising providing the first parameter value to a mobile device via a push notification.

8. A system, comprising:
at least one processor circuit; and
at least one memory that stores program code configured to be executed by the at least one processor circuit, the program code comprising:
a step selector configured to enable a workflow step to be selected by a developer for inclusion in a workflow, and to render a representation of the selected workflow step in a graphical user interface (GUI) displayed by a display screen;
a metadata analyzer configured to access interface definition information to obtain metadata defining an API (application programming interface) associated with the workflow step, and to analyze the metadata to determine a first input parameter of the API;
a list retriever configured to retrieve a dynamic list of selectable values for parameter value for the first input parameter; and
a step configuration UI (user interface) generator configured to render in the GUI including the rendered representation of the workflow step a first input control corresponding to the first input parameter, the first input control and rendered representation of the workflow step being simultaneously visible in the GUI, and to enable the developer to interact with the first input control to select from the dynamic list the first parameter value for the first input parameter, the selected first parameter value being provided to, and affecting the operation of, at least one of an application or service associated with the workflow step during operation of the workflow.

9. The system of claim 8, wherein the list retriever comprises:
an API caller configured to analyze the metadata to determine an address to direct an API call to retrieve the dynamic list, perform the API call, and receive the dynamic list.

10. The system of claim 9,
the system further including:
an input parameter selector configured to select a second input parameter of the API based on the selection of the first parameter value; and
the step configuration UI generator further configured to render in the GUI including the rendered representation of the workflow step a second input control corresponding to the second input parameter and enable the developer to interact with the second input control to select a second parameter value for the second input parameter.

11. The system of claim 10, wherein the step configuration UI generator is configured to enable the developer to interact with the second input control to select a second parameter value for the first input parameter such that multiple parameter values are selected for the first input parameter.

12. The system of claim 8, wherein the step configuration UI generator is configured to enable the developer to select the first parameter value from an output of a prior workflow step.

13. The system of claim 10, further comprising:
a control populator configured to automatically populate the second input control with a second input parameter value that is an output parameter value of a prior workflow step of the workflow.

14. The system of claim 8, wherein:
the step selector is further configured to enable a push notification workflow step to be selected by a developer for inclusion in the workflow that includes at least one other workflow step, the push notification workflow step configured to issue a push notification when encountered in the workflow and to wait for a response before enabling the workflow to continue; and
the step configuration UI generator is further configured to render a representation of the selected push notification workflow step in the GUI.

15. A computer-readable storage media having program code recorded thereon that when executed by at least one processor of a computing device causes the at least one processor to perform operations, the operations comprising:
enabling a workflow step to be selected by a developer for inclusion in a workflow;
rendering a representation of the selected workflow step in a graphical user interface (GUI) displayed by a display screen of the computing device;
accessing interface definition information to obtain metadata defining an API (application programming interface) associated with the workflow step;
analyzing the metadata to determine a first input parameter of the API;
rendering in the GUI including the rendered representation of the workflow step a first input control corresponding to the first input parameter;
retrieving a dynamic list of selectable values for a first parameter value for the first input parameter; and
enabling the first parameter value to be selected from the dynamic list by interacting with the first input control, the first input control and rendered representation of the workflow step being simultaneously visible in the GUI, wherein the first parameter value selected from the dynamic list is provided to and affects operation of at least one of an application or service associated with the workflow step during operation of the workflow.

16. The computer-readable storage media of claim 15, wherein said retrieving a dynamic list of selectable values for the first parameter value comprises:
analyzing the metadata to determine an address to direct an API call to retrieve the dynamic list;
performing the API call; and
receiving the dynamic list.

17. The computer-readable storage media of claim 16, wherein the operations further comprise:
receiving a selection of the first parameter value from the dynamic list from interaction with the first input control;
selecting a second input parameter of the API based on the selection of the first input parameter value;
rendering in the GUI including the rendered representation of the workflow step a second input control corresponding to the second input parameter; and
enabling the developer to interact with the second input control to select a second parameter value for the second input parameter.

18. The computer-readable storage media of claim 17, wherein the operations further comprise:
enabling the developer to interact with the second input control to select a second parameter value for the first input parameter such that multiple parameter values are selected for the first input parameter.

19. The computer-readable storage media of claim 15, wherein said enabling the developer to interact with the first input control to select a first parameter value for the first input parameter comprises:
enabling the developer to select the first parameter value from an output of a prior workflow step.

20. The computer-readable storage media of claim 15, wherein the operations further comprise providing the first parameter value to a mobile device via a push notification.

* * * * *